United States Patent
Matsuda et al.

(10) Patent No.: US 7,633,375 B2
(45) Date of Patent: Dec. 15, 2009

(54) INFORMATION SECURITY SYSTEM, ITS SERVER AND ITS STORAGE MEDIUM

(75) Inventors: Chiaki Matsuda, Kawasaki (JP); Kenji Oosawa, Kawasaki (JP); Yuji Morita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 293 days.

(21) Appl. No.: 11/442,981

(22) Filed: May 31, 2006

(65) Prior Publication Data
US 2007/0204348 A1 Aug. 30, 2007

(30) Foreign Application Priority Data
Feb. 27, 2006 (JP) ............... 2006-050680

(51) Int. Cl.
*H04L 9/32* (2006.01)
(52) U.S. Cl. .............. 340/5.74; 340/5.8; 340/5.61; 340/5.86; 340/628; 726/2; 726/26; 726/27; 713/166; 713/182; 713/300
(58) Field of Classification Search ........... 340/628, 340/5.8–5.86, 26, 5.2–5.74, 5.22–5.25; 726/2, 726/26, 27; 705/14, 18, 67; 713/166, 300–340, 713/182
See application file for complete search history.

(56) References Cited

U.S. PATENT DOCUMENTS

| | | | | | |
|---|---|---|---|---|---|
| 4,962,449 | A | * | 10/1990 | Schlesinger | .............. 726/21 |
| 5,018,096 | A | * | 5/1991 | Aoyama | .............. 711/164 |
| 5,748,084 | A | * | 5/1998 | Isikoff | .............. 340/568.1 |
| 5,790,074 | A | * | 8/1998 | Rangedahl et al. | ...... 342/357.13 |
| 5,922,073 | A | * | 7/1999 | Shimada | .............. 726/6 |
| 6,232,877 | B1 | * | 5/2001 | Ashwin | .............. 340/572.1 |
| 6,987,948 | B2 | * | 1/2006 | Engstrom et al. | .............. 455/41.1 |
| 7,108,177 | B2 | * | 9/2006 | Brookner | .............. 235/382 |
| 2002/0078372 | A1 | * | 6/2002 | Aluzzo et al. | .............. 713/200 |
| 2004/0186768 | A1 | * | 9/2004 | Wakim et al. | .............. 705/14 |
| 2005/0044377 | A1 | * | 2/2005 | Huang | .............. 713/182 |
| 2005/0283444 | A1 | * | 12/2005 | Ekberg | .............. 705/67 |
| 2006/0224887 | A1 | * | 10/2006 | Vesikivi et al. | .............. 713/166 |
| 2006/0265598 | A1 | * | 11/2006 | Plaquin et al. | .............. 713/182 |
| 2007/0096871 | A1 | * | 5/2007 | Mason et al. | .............. 340/5.61 |

FOREIGN PATENT DOCUMENTS

| | | |
|---|---|---|
| JP | 11-332631 | 12/1999 |
| JP | 2001-290553 | 10/2001 |
| JP | 2002-157040 | 5/2002 |
| JP | 2004-240645 | 8/2004 |

* cited by examiner

Primary Examiner—Benjamin C Lee
Assistant Examiner—Sisay Yacob
(74) Attorney, Agent, or Firm—Fujitsu Patent Center

(57) ABSTRACT

An RFID notification unit enables an RFID reader to regularly read the RFID code of an RFID tag attached to the relevant terminal itself, its user and its current location and transmits the RFID code to a server. Upon receipt of this code, the using qualification determination unit of the server determines the current using qualification of the terminal referring to a using condition storage unit. When a user attempts to open an important information file, a file using control unit issues a request to the server. A permit determination unit determines whether to permit the opening of the relevant file, based on the using qualification and the storage contents of a file/level storage unit. When the opening is permitted, the important information file is downloaded onto the terminal or its decoding key is returned.

12 Claims, 20 Drawing Sheets

| TABLE 30 | | |
|---|---|---|
| RFID CODE | RFID CODE | RFID CODE |
| RFID TERMINAL-0301 | RFID PEOPLE-0301 | RFID LOCATION-K301 |

31 → TABLE 30; 32, 33 column labels

F I G. 5 A

IN USE FILE TABLE 40

| FILE NAME | SECURITY LEVEL |
|---|---|
| a.txt | 0 |
| b.doc | 1 |

F I G. 5 B

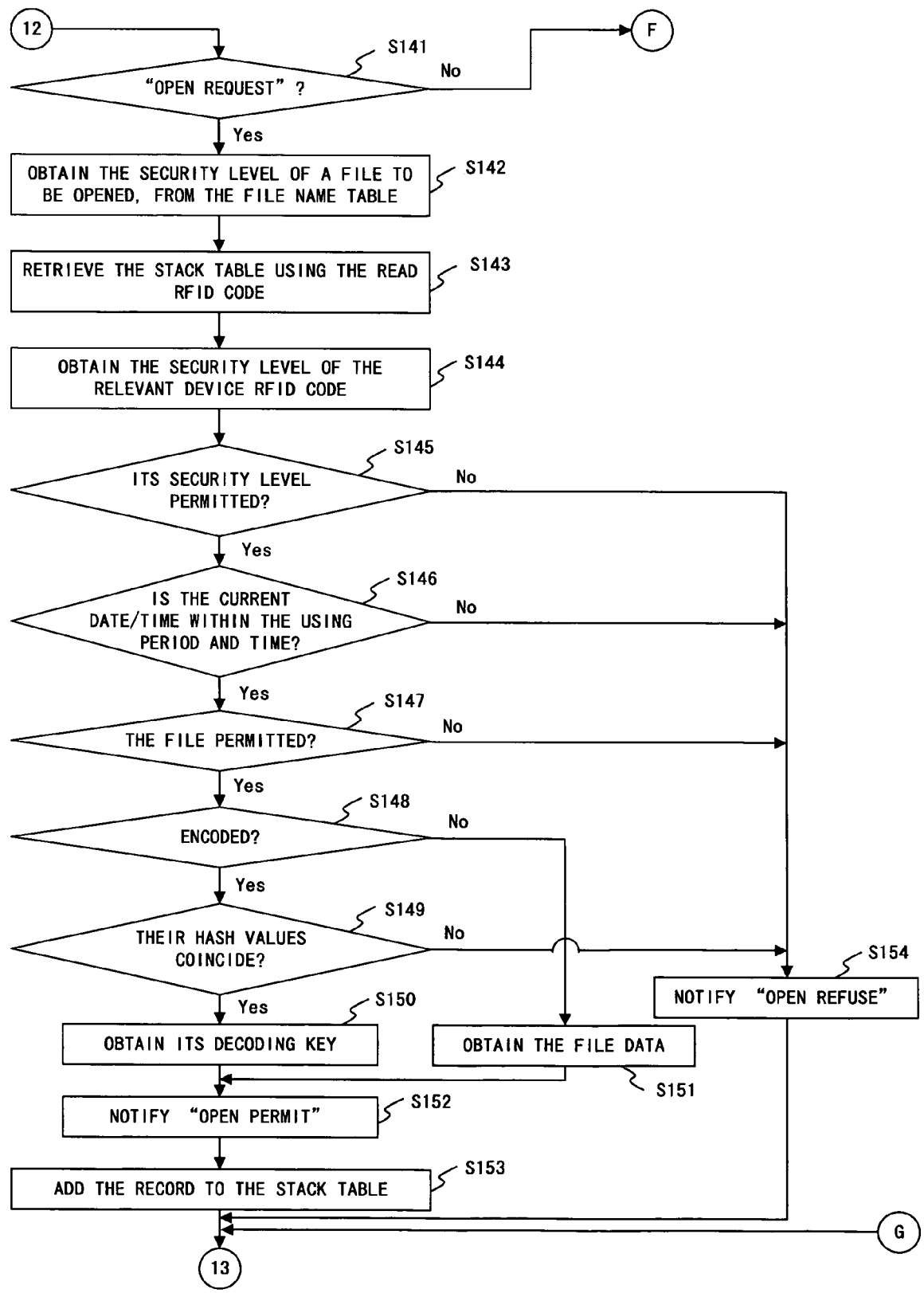
F I G. 8 A

STACK TABLE (SERVER) 50

| RFID CODE (PC) 51 | RFID CODE (PEOPLE) 52 | RFID CODE (LOCATION) 53 | SECURITY LEVEL 54 | USING PERIOD 55 | USING TIME 56 | FILE NAME 57 |
|---|---|---|---|---|---|---|
| RFID TERMINAL-0301 | RFID PEOPLE-0301 | RFID LOCATION-Y021 | 1 | 2005/10/28 | 10:00~12:00 | ABC.XLS |
| RFID TERMINAL-0302 | RFID PEOPLE-0302 | — | 0 | | | |
| RFID TERMINAL-0303 | — | RFID LOCATION-K303 | 0 | | | |
| RFID TERMINAL-0304 | — | — | 0 | | | |
| RFID TERMINAL-0305 | RFID PEOPLE-0305 | — | 0 | | | |

FIG. 9A

POLICY TABLE (SERVER) 60

| DEVICE | | USER | | | USING PLACE | | POLICY | | | |
|---|---|---|---|---|---|---|---|---|---|---|
| RFID CODE 61a | OWNER 61b | RFID CODE 62a | NAME 62b | | RFID CODE 63a | PLACE NAME 63b | SECURITY LEVEL 64a | USING PERIOD 64b | USING TIME 64c | FILE NAME 64d |
| RFID TERMINAL-0201 | TARO FUJITSU | RFID PEOPLE-0201 | TARO FUJITSU | | RFID LOCATION-K201 | SS KAMATA ... | 1 | * | * | *.* |
| RFID TERMINAL-0301 | ICHIRO FUJITSU | RFID PEOPLE-0301 | ICHIRO FUJITSU | | RFID LOCATION-K301 | SS KAMATA ... | 1 | BUSINESS DAY | * | *.* |
| RFID TERMINAL-0302 | JIRO FUJITSU | RFID PEOPLE-0302 | JIRO FUJITSU | | RFID LOCATION-K302 | SS KAMATA ... | 1 | BUSINESS DAY | 8:00~20:00 | *.* |
| RFID TERMINAL-0303 | HANAKO FUJITSU | RFID PEOPLE-0303 | HANAKO FUJITSU | | RFID LOCATION-K303 | SS KAMATA ... | 1 | BUSINESS DAY | | *.* |
| RFID TERMINAL-0304 | MR A | RFID PEOPLE-0304 | MR A | | RFID LOCATION-K304 | OWN SEAT (A) | 1 | BUSINESS DAY | | *.* |
| RFID TERMINAL-0304 | MR A | RFID PEOPLE-0305 | MR A'S BOSS B | | RFID LOCATION-K305 | OWN SEAT (B) | 1 | * | | *.* |
| RFID TERMINAL-0304 | MR A | RFID PEOPLE-0305 | MR A'S BOSS B | | RFID LOCATION-K304 | OWN SEAT (A) | 1 | * | | *.* |
| RFID TERMINAL-0305 | MR B | RFID PEOPLE-0305 | MR B | | RFID LOCATION-K305 | OWN SEAT (B) | 1 | BUSINESS DAY | | *.* |
| RFID TERMINAL-0501 | TARO AND OTHER THREE | RFID PEOPLE-0201 | TARO FUJITSU | | RFID LOCATION-K501 | THE FIFTH FLOOR OF SS KAMATA | 1 | BUSINESS DAY | | *.* |
| RFID TERMINAL-0501 | TARO AND OTHER THREE | RFID PEOPLE-0301 | ICHIRO FUJITSU | | RFID LOCATION-K501 | THE FIFTH FLOOR OF SS KAMATA | 1 | BUSINESS DAY | | *.* |
| RFID TERMINAL-0501 | TARO AND OTHER THREE | RFID PEOPLE-0302 | JIRO FUJITSU | | RFID LOCATION-K501 | THE FIFTH FLOOR OF SS KAMATA | 1 | BUSINESS DAY | | *.* |
| RFID TERMINAL-0501 | TARO AND OTHER THREE | RFID PEOPLE-0303 | HANAKO FUJITSU | | RFID LOCATION-K501 | THE FIFTH FLOOR OF SS KAMATA | 1 | BUSINESS DAY | | *.* |
| RFID TERMINAL-0502 | MR A, MR B | RFID PEOPLE-0304 | MR A | | RFID LOCATION-K502 | THE FIFTH FLOOR OF SS KAMATA | 1 | BUSINESS DAY | | *.* |
| RFID TERMINAL-0502 | MR A, MR B | RFID PEOPLE-0305 | MR B | | RFID LOCATION-K502 | THE FIFTH FLOOR OF SS KAMATA | 1 | BUSINESS DAY | | *.* |

THE FOLLOWING IS AN Additional TABLE 70

| RFID TERMINAL-0201 | TARO FUJITSU | RFID PEOPLE-0201 | TARO FUJITSU | | RFID LOCATION-M901 | SYSTEM LABORATORY MAKUHARI | 1 | | | STU.DUC |
| RFID TERMINAL-0301 | ICHIRO FUJITSU | RFID PEOPLE-0301 | ICHIRO FUJITSU | | RFID LOCATION-Y021 | THE SECOND FLOOR OF A CUSTOMER | 1 | 2005/10/28 | 10:00~12:00 | ABC.XLS |

→ A PLURALITY OF LEVELS CAN BE APPLIED BY DEFINING IT FOR EACH LEVEL →

| FILE NAME TABLE (SERVER) 70 | | | |
|---|---|---|---|
| DEVICE RFID | FILE NAME | SECURITY LEVEL | HASH VALUE |
| RFID TERMINAL0301 | ABC.XLS | 1 | xxxxxxxx |
| RFID TERMINAL0302 | ABC.XLS | 1 | |
| RFID TERMINAL0301 | XYZ.DOC | 1 | |
| RFID TERMINAL0301 | DEF.DOC | 1 | |

FIG. 10

| RETRIEVAL RULE | | | |
|---|---|---|---|
| NO. | POLICY | FORM | SECURITY LEVEL |
| 1 | THE FILE INCLUDES THE FOLLOWING KEYWORDS | SECRET FROM PEOPLE OUTSIDE THE COMPANY<br>SECRET FROM PEOPLE OTHER THAN THE CONCERNED<br>CONFIDENTIAL INFORMATION<br>SECRET INFORMATION<br>TOP SECRET<br>INTERNAL USE ONLY<br>CONFIDENTIAL<br>... | 1 |
| 2 | PERSONAL INFORMATION (NAME, ADDRESS, MAIL ADDRESS, EMPLOYEE ID, ETC.) REPEATEDLY APPEARS MORE THAN XX TIMES | MORE THAN FIVE TIMES | 1 |
| 3 | COMPANY INFORMATION (COMPANY NAME, ADDRESS, NAME OF A PERSON IN CHARGE, SETTLEMENT INFORMATION, ETC.) REPEATEDLY APPEARS MORE THAN XX TIMES | MORE THAN FIVE TIMES | 1 |
| 4 | FINANCIAL INFORMATION (AMOUNT, ASSET, ETC.) REPEATEDLY APPEARS MOTRE THAN XX TIMES | MORE THAN FIVE TIMES | 1 |
| 5 | NETWORK INFORMATION (IP ADDRESS, MACHINE NAME, ETC.) REPEATEDLY APPEARS MORE THAN XX TIMES | MORE THAN TEN TIMES | 1 |
| 6 | THE PASS OF A FILE INCLUDES THE STORAGE FOLDER OF CONFIDENTIAL INFORMATION | ¥¥secret¥customer_info | 1 |
| ... | | | |
| 99 | WHEN ANY OF THE ABOVE-DESCRIBED RULES APPLIES | | 0 |

SCREEN IMAGE

[NORMAL USING APPLICATION]

USER NAME :
DEVICE NAME :

USING PLACE :
BOSS :
COLLEAGUE :
TIMER :

TRANSMIT     CANCEL

F I G. 1 1 A

[CARRY-OUT APPLICATION]

USER NAME :
DEVICE NAME :

USING PLACE :
TARGET FILE :                                         REFER
USING PERIOD :        / /   ~   / /
USING TIME :           :    ~    :

TRANSMIT     CANCEL

DEVICE RFID CORRESPONDENCE TABLE (SERVER)

| RFID CODE | NAME OF DEVICE OWNER |
|---|---|
| RFID TERMINAL-0201 | TARO FUJITSU |
| RFID TERMINAL-0301 | ICHIRO FUJITSU |
| RFID TERMINAL-0302 | JIRO FUJITSU |
| RFID TERMINAL-0303 | HANAKO FUJITSU |
| RFID TERMINAL-0304 | MR A OF FUJITSU |
| RFID TERMINAL-0305 | MR B OF FUJITSU |
| RFID TERMINAL-0501 | TARO, ICHIRO, JIRO AND HANAKO |
| RFID TERMINAL-0502 | MESSRS A AND B |

FIG. 12B

USER RFID CORRESPONDENCE TABLE (SERVER)

| RFID CODE | NAME | DEPARTMENT | MANAGER |
|---|---|---|---|
| RFID PEOPLE-0201 | TARO FUJITSU | ○○HEADQUARTERS □□DEPARTMENT | ○ |
| RFID PEOPLE-0301 | ICHIRO FUJITSU | ○○HEADQUARTERS □□DEPARTMENT | – |
| RFID PEOPLE-0302 | JIRO FUJITSU | ○○HEADQUARTERS □□DEPARTMENT | – |
| RFID PEOPLE-0303 | HANAKO FUJITSU | ○○HEADQUARTERS □□DEPARTMENT | – |
| RFID PEOPLE-0304 | MR A OF FUJITSU | ○○HEADQUARTERS ◇◇DEPARTMENT | – |
| RFID PEOPLE-0305 | MR B OF FUJITSU | ○○HEADQUARTERS ◇◇DEPARTMENT | ○ |

FIG. 12C

LOCATION INFORMATION RFID CORRESPONDENCE TABLE (SERVER)

| RFID CODE | USING PLACE NAME | PLACE (BUILDING NAME) | FLOOR NUMBER | TYPE | DESK NUMBER |
|---|---|---|---|---|---|
| RFID LOCATION-K201 | OWN SEAT OF TARO FUJITSU | SS KAMATA | 5F | C1 | 21 |
| RFID LOCATION-K301 | OWN SEAT OF ICHIRO FUJITSU | SS KAMATA | 5F | C1 | 01 |
| RFID LOCATION-K302 | OWN SEAT OF JIRO FUJITSU | SS KAMATA | 5F | C1 | 02 |
| RFID LOCATION-K303 | OWN SEAT OF HANAKO FUJITSU | SS KAMATA | 5F | C1 | 03 |
| RFID LOCATION-K304 | OWN SEAT OF MR A OF FUJITSU | SS KAMATA | 5F | C1 | 04 |
| RFID LOCATION-K305 | OWN SEAT OF MR B OF FUJITSU | SS KAMATA | 5F | C1 | 05 |
| RFID LOCATION-K501 | THE FIFTH FLOOR OF SS KAMATA | SS KAMATA | 5F | C1 | 05 |
| RFID LOCATION-K502 | THE FIFTH FLOOR OF SS KAMATA | SS KAMATA | 5F | C1 | 05 |
| RFID LOCATION-K735 | CONFERENCE ROOM 735 | SS KAMATA | 7F | CONFERENCE ROOM | 735 |
| RFID LOCATION-M901 | THE NORTH ANNEX ON THE FIFTH FLOOR OF A VISIT DESTINATION IN MAKUHARI SYSTEM LABORATORY KAMATA | 9F | THE NORTH ANNEX | 0901 |
| RFID LOCATION-Y021 | THE SECOND FLOOR OF A CUSTOMER COMPANY A | CUSTOMER COMPANY A | 2F | | 021 |

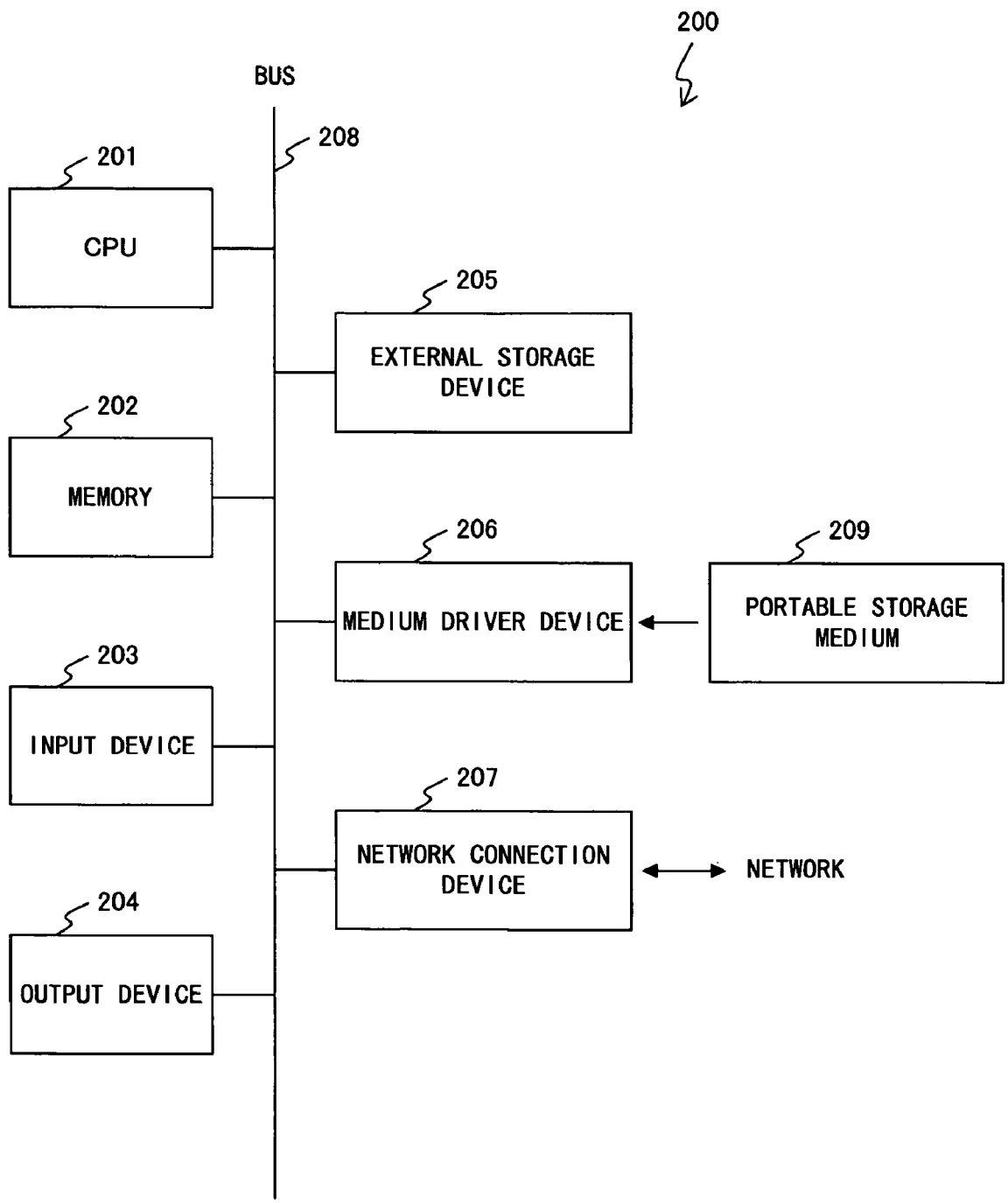
F I G. 1 3

INFORMATION SECURITY SYSTEM, ITS SERVER AND ITS STORAGE MEDIUM

BACKGROUND OF THE INVENTION

1. Field of the Invention

The present invention relates to a method for preventing information from leaking, also using existence location information of an information processing device.

2. Description of the Related Art

Conventionally, for example, there are prior arts disclosed by patent references 1 and 2.

Patent reference 1 discloses a technology for obtaining the location information of an information processing device by a global poisoning system (GPS), determining whether there is a location change, by comparison with location information stored in the information processing device or the like and compulsorily stopping the information processing device (or regulating, for example, requiring the input of a password) if there is such a change. Thus, the information processing device itself or information stored in the information processing device can be prevented from being stolen.

Patent reference 2 aims to supplement the incompleteness of an authentication system and discloses a technology for authenticating a user by the combination of optimal authentication methods according to the user, the type of a transaction and the like (for example, the combination of a password, time and a voiceprint). Patent reference 2 also discloses an authentication method for permitting a transaction in a predetermined location by specifying the location information of a client terminal by a GPS or base station information if a cellular phone is used as the client terminal.

Patent reference 1: Japanese Patent Application Publication No. 2001-290553

Patent reference 2: Japanese Patent Application Publication No. 2004-240645

Patent reference 3: Japanese Patent Application Publication No. 2002-157040

Patent reference 4: Japanese Patent Application Publication No. H-11-332631

Recently, for example, the leak of important corporate information has been a problem. More particularly, recently, each employee often has carried and used an information processing terminal which can be carried, such as a notebook personal computer or the like (hereinafter called as portable information processing terminal). For example, a salesperson or the like sometimes carries a portable information processing device, such as a notebook personal computer or the like to a sales destination and performs a product explanation, presentation or the like. In such a case, data for the product explanation or presentation (in some case, important information or the like) is stored in advance in the notebook personal computer and the salesperson carries the notebook personal computer to a customer.

Therefore, for example, if the notebook personal computer is lost or stolen on the way to a customer, there is a possibility that important information may leak. Even when a user other than its owner can be prevented from using the notebook personal computer by a fingerprint or the like, there is a possibility that its hard disk may be taken out and the information may be read.

Furthermore, the information leak is not limited only to steal, loss and the like. There is a possibility that the information leaks due to the careless behavior of the employee. For example, when the salesperson sometimes displays data, for example, for a final confirmation or the like, on the way to the sales destination (on a train, in a coffee shop or the like), there is a possibility that a third party nearby may read the contents of the data. There is also a possibility that the employee with an evil intention may steal or read the important information or the like.

Furthermore, even when the notebook personal computer is used in a company, there is also information which should be kept secret from people outside the department, such as information only for people in the department.

As to such a problem, if an access to the important information is severely restricted, there is also a possibility that a job may be hindered.

In Patent reference 1, since the using place of the information processing device is fixed to prevent it from being used in another place, such a problem presuming the use in another place cannot be coped with.

Although in Patent reference 2 its using place is not fixed and furthermore the current location is also taken into consideration, it cannot solve the problem. Specifically, Patent reference 2 cannot prevent important information or the like from leaking without severely restricting the access to the important information or the like.

Furthermore, since it is difficult to receive waves from a satellite in a building when using a GPS, it becomes difficult to locate a position. Even when base station information is used, a location can be any place if it can communicate with a predetermined base station. Therefore, for example, only a specific place in the company (for example, only a conference room, only a boss's seat or the like) cannot be specified.

SUMMARY OF THE INVENTION

It is an object of the present invention to provide an information security system, a server thereof and a storage medium thereof and the like, capable of remarkably reducing the possibility that important information may leak more particularly when using a portable information processing terminal.

In the information security system of the present invention, each portable information processing device comprises an identification information detection/notification unit for detecting detectable identification information, of the identification information of the portable information processing device, the identification information of a user and the identification information of a place and notifying a server of the information and a file using control unit for making an inquiry of the server if a file is a security target file when a user specifies an arbitrary file and controlling the use of the specified file, according to a response to the inquiry. The server comprises a first storage unit for storing in advance its using qualification in connection with each specific combination of the three types of identification information, a second storage unit for storing in advance a level for each file, a using qualification determination unit for giving its using qualification to a notifier portable information processing device, according to a specific combination stored in the first storage unit if each piece of the notified identification information coincides with the specific combination and a using permit determination unit for determining whether to permit the use of the specified file by computing the level of the specified file by referring to the second storage unit when there is the inquiry and comparing the level with the using qualification given to the inquirer's portable information processing device and replying to the file using control unit.

In the information security system, it is determined whether the user has qualification for the security target file, by detecting the current using state (a user and a place) for each portable information processing device and notifying the server of the state. Even if a user or the like attempts to refer to the security target file in a portable information processing device without using qualification for the security target file, the user or the like is not permitted to refer to the file. For example, if the current using place is a place other than the specific place (a user's seat, a conference room, a specific customer or the like) stored in the first storage unit even when the user itself is the legal owner of the portable information processing device, the user cannot refer to the security target file.

For example, predetermined using conditions are also stored in the first storage unit, and even when each piece of the notified identification information coincides with the specific combination stored in the first storage unit, no using qualification can also be given if the using conditions are not met. Specifically, the criterion on whether the user has qualification for the security target file is not limited to a specific combination of the three types of identification information and some condition, such as a using date or the like can also be added. Alternatively, when giving a using qualification for a security target file, only a specific security target file registered in advance can be referenced instead of permitting reference to all security target files.

According to the information security system, its server, its storage medium or the like, the possibility that important information may leak can be remarkably reduced more particularly when using a portable information processing device.

BRIEF DESCRIPTION OF THE DRAWINGS

FIGS. 5A and 5B show examples of a table stored in the user PC terminal;

FIGS. 8A,8B is a flowchart showing the process of a server (No. 3);

FIGS. 9A-9C show examples stored in the server (No. 1);

FIG. 10 shows an example of a security level determination method using a security dictionary database (DB);

FIGS. 11A and 11B show examples of an application screen;

FIGS. 12A-12C show examples stored in the server (No. 2);

FIG. 13 shows the hardware configuration of a computer; and

DESCRIPTION OF THE PREFERRED EMBODIMENTS

The preferred embodiments of the present inventions are described below with reference to the drawings.

In the following description of the preferred embodiments, it is assumed that the normal and temporary using environments of a terminal 10 are "in a company" and "out of a company", respectively, and that a user is an employee. However, this is an example, and the present invention is not limited to the example.

Figure 1:
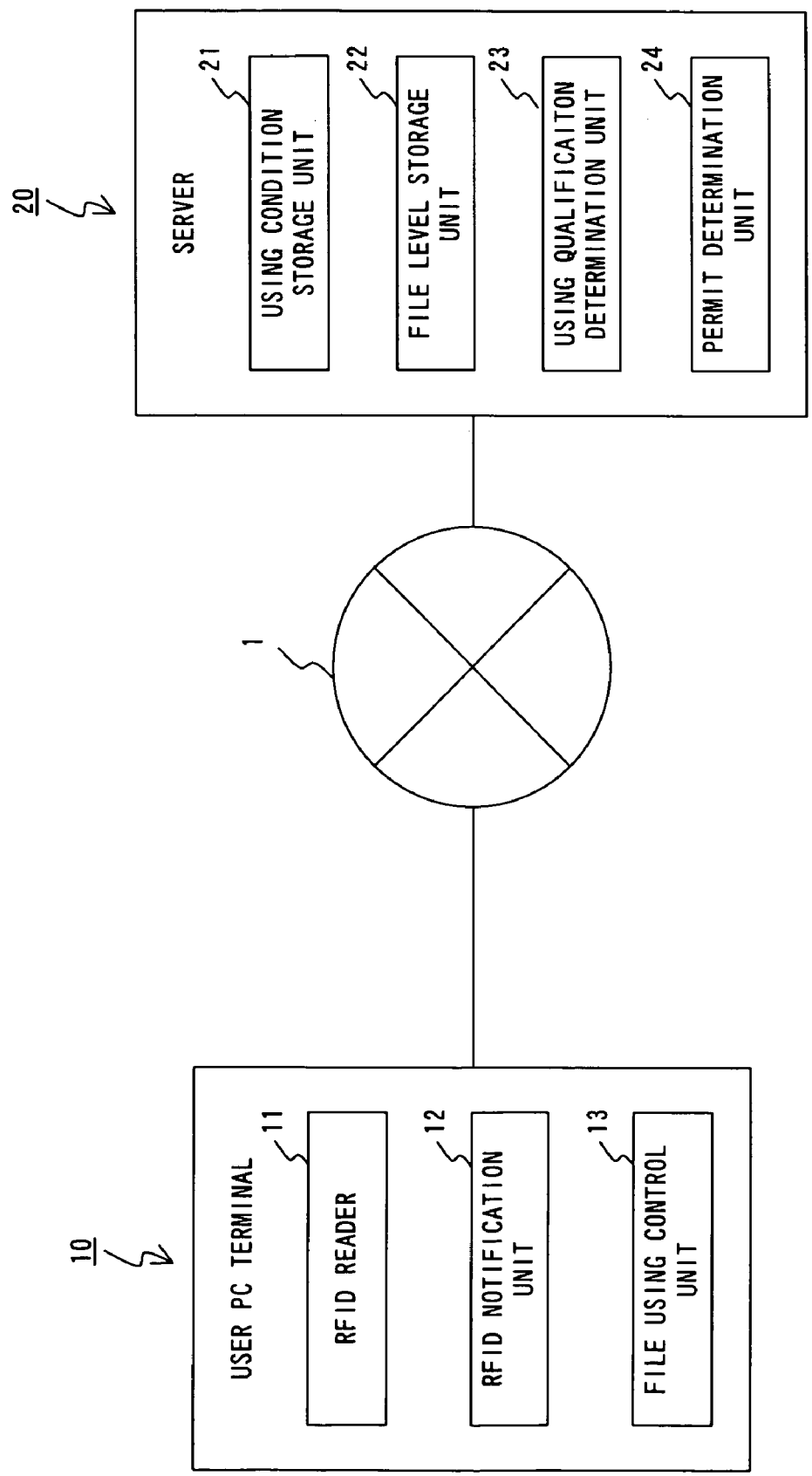
FIG. 1 shows the system configuration of this entire information security system.

FIG. 1 shows the system configuration of this entire information security system.

Firstly, this method utilizes, for example, a radio frequency identification (RFID) technology in order to detect the identification information of a portable information processing device, such as a notebook personal computer or the like, the identification information of a user and the identification information of a place. As well known, the RFID provides a mechanism for identifying/managing a person and a thing by a very small radio chip. Generally, data is stored in a tag with the size of several centimeters (RFID tag), which is made to communicate with a reader (RFID reader) by an electric wave or an electro-magnetic wave. Recently, a semi-eternally usable RFID tag without a battery has appeared thanks to a non-contact power transmission technology on the antenna side. The RFID tag has various shapes, such as a label type, a card type, a coin type, a stick type and the like, one of which is selected according to its usage. Its communication distance covers several millimeters to several meters, which is also determined according to its usage. This method requires a communication distance of several centimeters to several meters.

The user PC terminal 10 is, for example, an information processing device provided to each employee of an arbitrary company, and more particularly is a portable information processing device, such as a notebook personal computer or the like. Each employee does business using its own user PC terminal 10. Usually, each employee generates a file necessary for business, obtains a common file from a server 20 and obtains a necessary file from another user PC terminal 10. Then, each employee stores these files in its own user PC terminal 10 and refers to/modifies them as required.

However, in this method, even a personal file storing important information (important information file, that is, security target file) generated by the relevant user cannot be referenced unless the permit of the server 20 is obtained each time. Thus, the leak of important information due to the carelessness or malicious behavior of the employee can be prevented. The first permit conditions of the server 20 is the current using state (a user and a place) of the user PC terminal 10, which will be described in detail later. In order to detect this using state, each user PC terminal 10 comprises an RFID reader.

An RFID tag (called "device RFID tag") is attached to the user PC terminal 10 in advance. This is pasted by a seal, embedded in its cabinet or so on. An RFID tag (called "user RFID tag") is also attached to each employee (attached to a coat, a necktie or the like. Alternatively, it is built in its ID card or the like) in advance.

Furthermore, an RFID tag (called "place RFID tag") is attached to various places in which the user PC terminal 10 is anticipated to be used. Its attaching place is, for example, each employee's seat, a meeting room and a conference room in a company or a plant, a laboratory and a branch office in another place. The place RFID tag is attached not only to its own company but also to each client's company. Its attaching position is a desk, a floor, a ceiling, a pole, a wall or the like.

The user PC terminal 10 is also provided with a communication function to access the server 20 via a network 1. When accessing the server 20, it can be connected to a LAN or the like. However, since it is anticipated to access to outside a company (customer), it is preferable, for example, for the terminal 10 to have a cellular phone function or a communication function to a radio LAN. In this case, for example, the terminal 10 accesses the server 20 via the Internet or the like. In other words, the network 1 is a LAN, the Internet, a cellular phone network or the like.

The user PC terminal 10 also comprises an RFID notification unit 12 and a file using control unit 13.

The RFID notification unit 12, for example, enables the RFID reader 11 to read the data (RFID code) of the three types of RFID tags regularly/according to a user's operation and transmits the data to the server 20. In response to this, a using qualification (a security level described later) is given (is notified) from the server 20 to the relevant terminal 10. Then, the RFID notification unit 12 stores the using qualification.

The file using control unit 13 issues an open request/store request to the server 20 according to an arbitrary user's file operation ("open", "store" or the like) if this file is a security target file (for example, important file). If the server 20 does not permit this request, the security target file is not opened/stored. To store mean to store a file in a portable storage medium, such as a flexible disk (FD), a CD-R or the like. If the file is other than the security target file (a general information file), the file can be freely opened or soon without the permit of the server 20.

The server 20 comprises a using condition storage unit 21, a file/level storage unit 22, a using qualification determination unit 23 and a permit determination unit 24.

The using condition storage unit 21 stores, for example, a policy table 60, which will be described later, and more particularly stores using qualification in connection with a specific combination of the three types of RFID tag/data. The using condition storage unit 21 can also register a using qualification after also adding a condition, such as a using period/time, a file name or the like.

When receiving the RFID code from the RFID notification unit 12 of the user PC terminal 10, the using qualification determination unit 23 refers to the using condition storage unit 21 and determines the current using qualification of the relevant user PC terminal 10.

The file/level storage unit 22 stores security levels for each file. The higher its important degree is, the higher its security level becomes. However, in the following description, it is assumed that the security level has only 0 (for a general information file) and 1 (for an important information file (=security target file) for convenience' sake. Actually, the security level is not limited to this example.

When receiving the open request or the like of the security target file, the permit determination unit 24 obtains the security level of the file to be opened referring to the file/level storage unit 22 and determines whether the opening of this file should be permitted by comparing the security level with the current using qualification. However, in this method, a permit notice is not transmitted to the user PC terminal 10 when permitting the opening. For example, basically, the user PC terminal 10 stores no security target files at all, and only when permitting it, the permitted security target file is downloaded on to the user PC terminal 10 each time. Alternatively, although the user PC terminal 10 stores a security target file, the file is entirely encoded and a decoding key is given only when permitting it.

By using the three types of RFID codes as a permit condition, for example, even when its owner itself uses its own user PC terminal, important information cannot be obtained/read in places other than the specific place (place in which a place RFID tag is attached). Even in the specific place, a person whose use of the user PC terminal 10 is not permitted can be prevented from reading important information by the determination process of the server 20 using a user RFID tag when attempting to read the important information. Thus, the risk that a third party may steal and read the important information is avoided, whose details will be described later.

Figure 7:
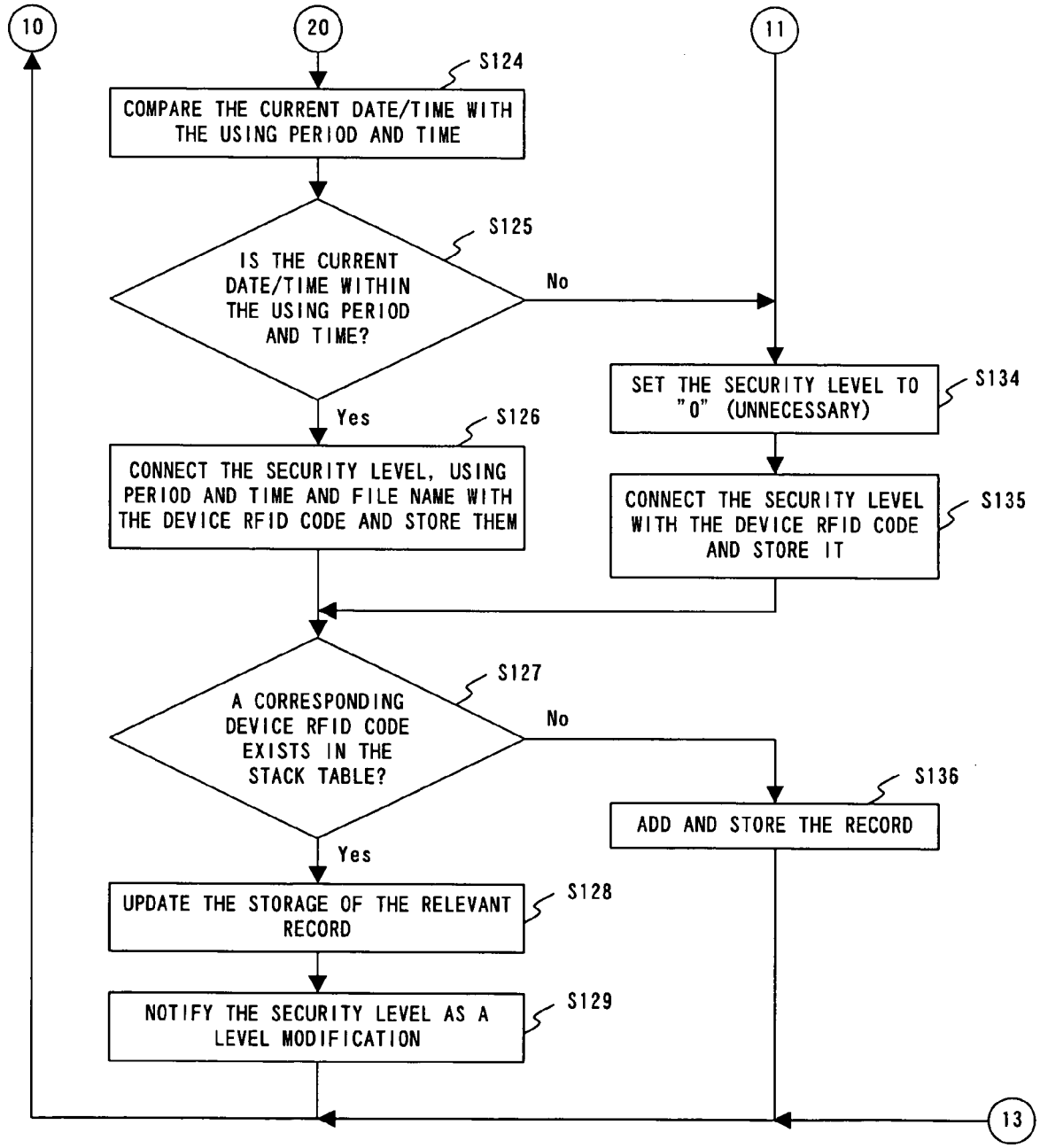
FIG. 7 is a flowchart showing the process of a server (No. 2)
Figure 8B:
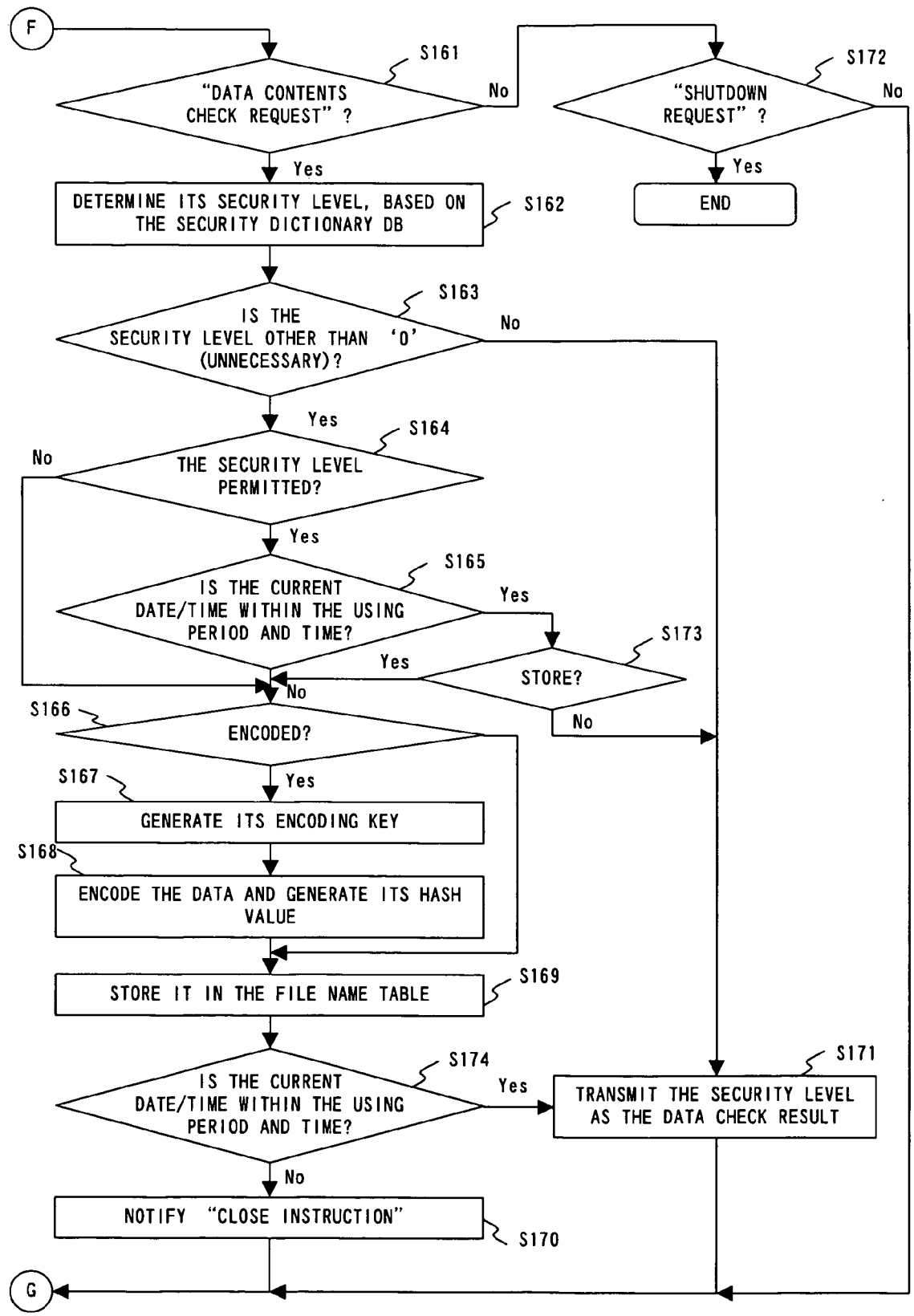

As examples of the more detailed configuration of the system shown in FIG. 1, the server 20 can be connected to the network 1 via a router or a firewall. Alternatively, the server 20 can not limited to a single server, and can be composed of an authentication server for performing the processes shown in FIGS. 6 through 8, which will be described later, a file server for storing a variety of files, a time authentication server and the like. The RFID reader 11 can also be built in the user PC terminal 10 or can be externally connected (by a USB connection or the like).

FIGS. 2A through 4 are flowcharts showing the process of the user PC terminal 10.

Figure 2A:
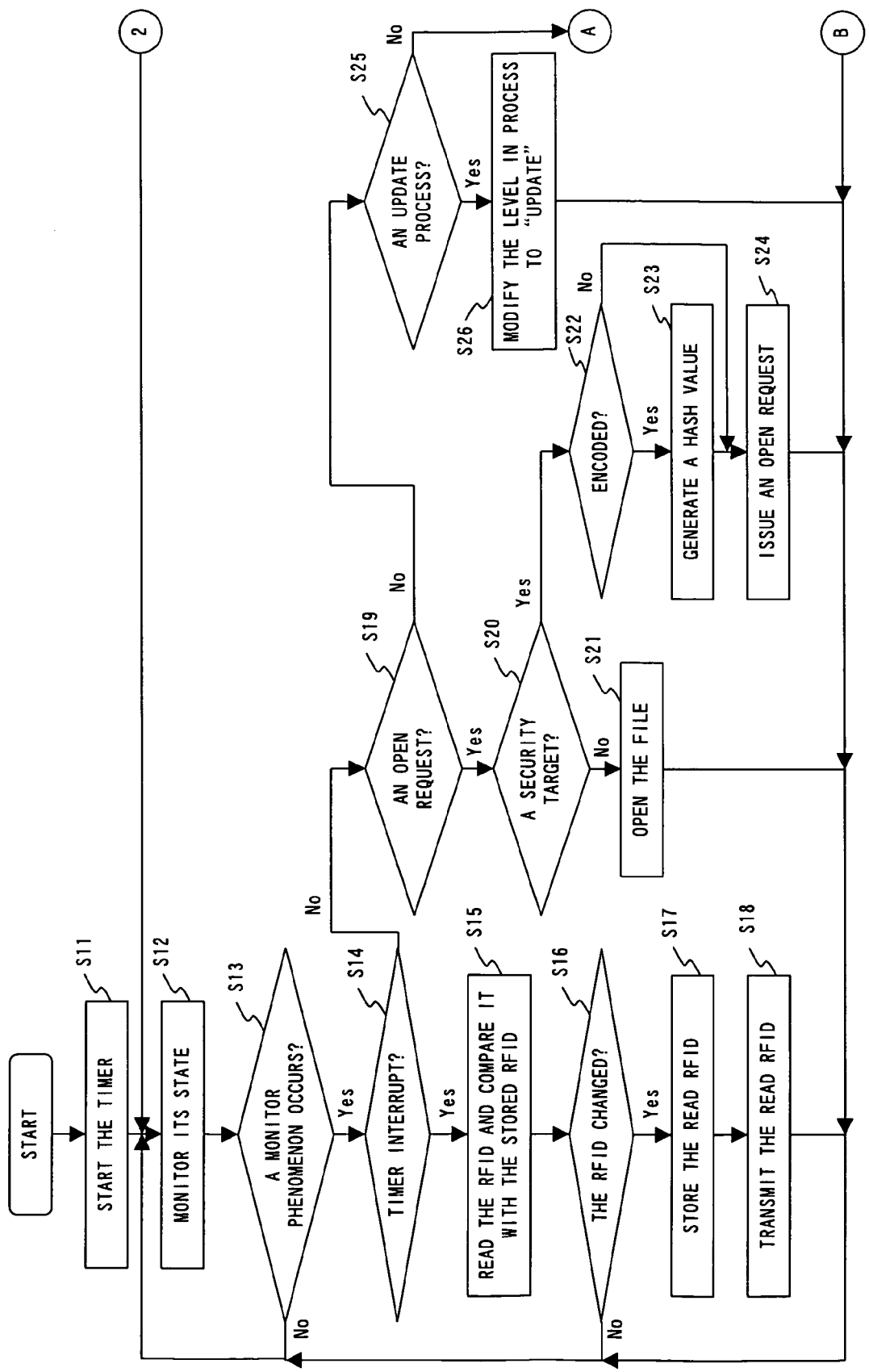
FIGS. 2A,2B is a flowchart showing the process of a user PC terminal (No. 1)
Figure 2B:
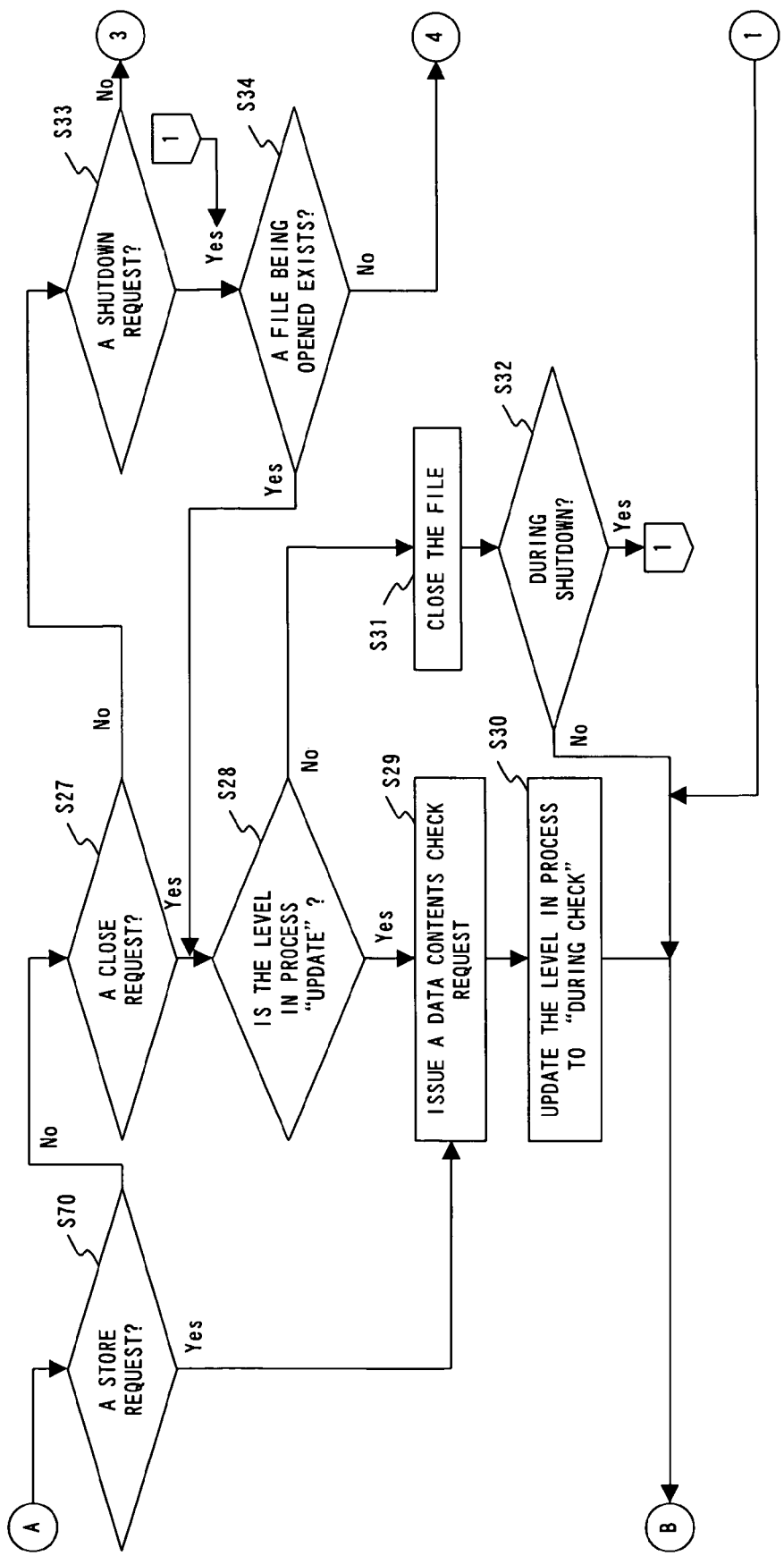
Figure 3A:
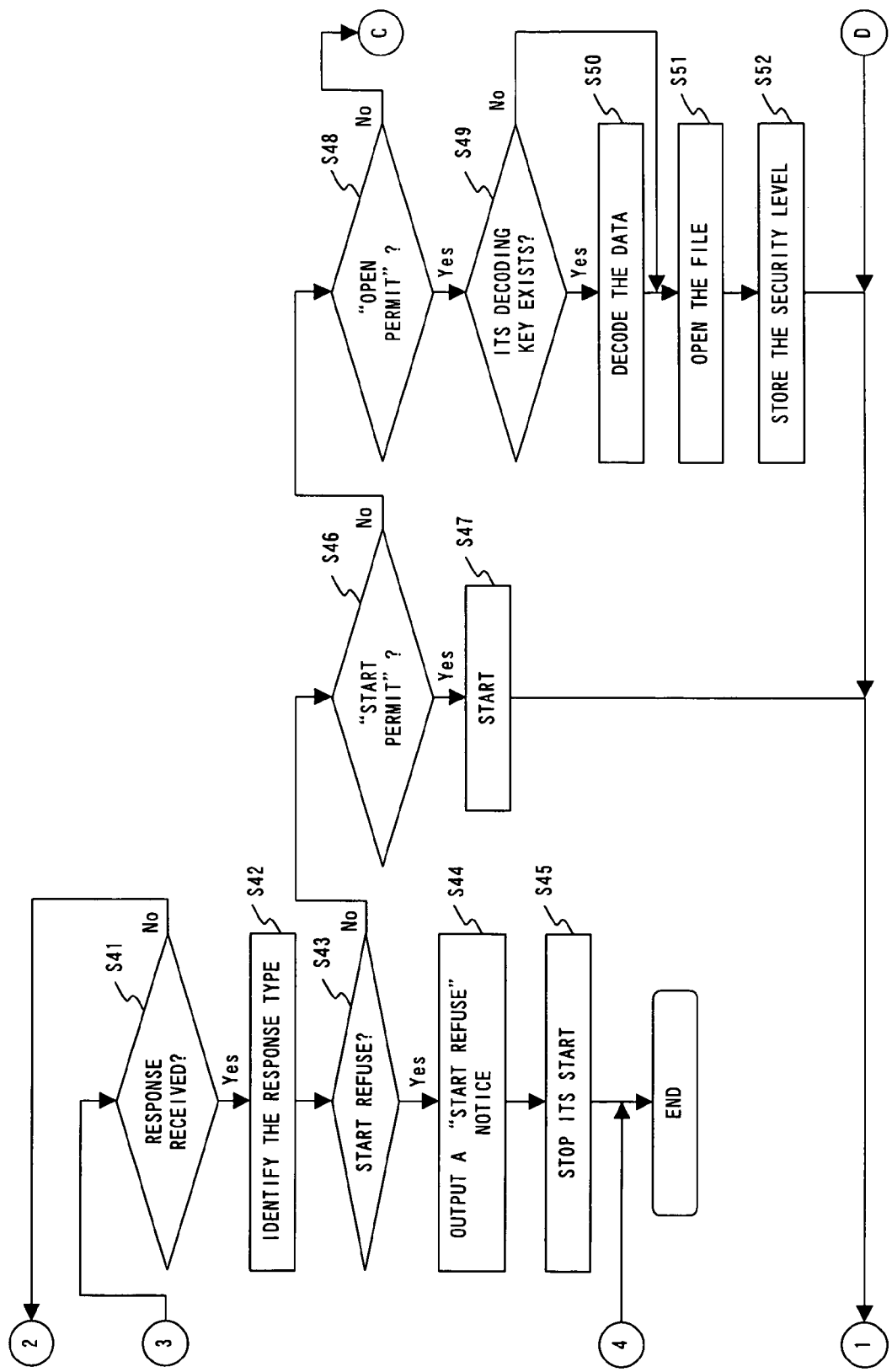
FIGS. 3A,3B is a flowchart showing the process of a user PC terminal (No. 2)
Figure 3B:
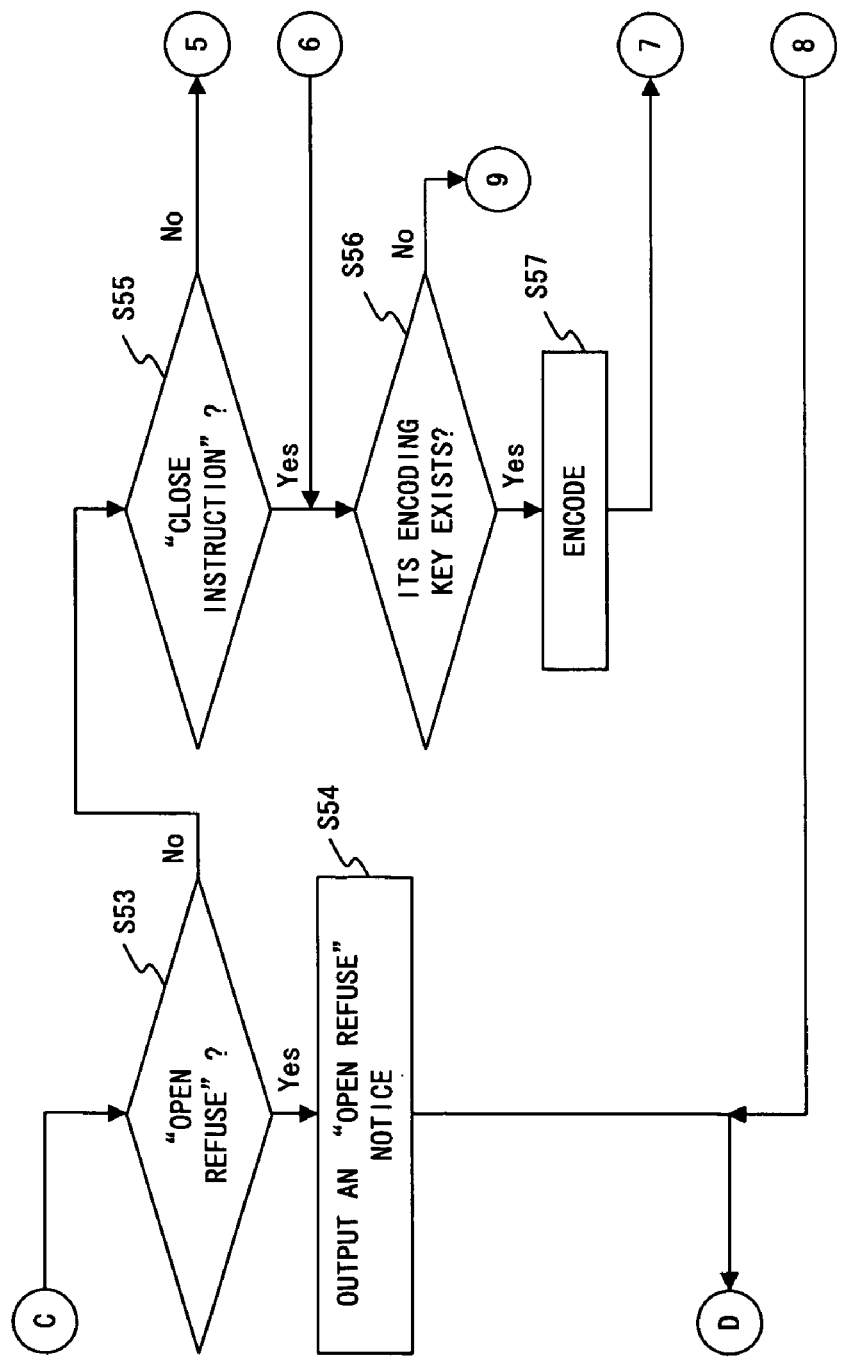

Firstly, in FIG. 2A, immediately after power is switched on, the user PC terminal 10 immediately starts a timer (step S11). Then, the terminal 10 repeats the time-up and a re-start like time-up→re-start→time-up→re-start and so on. Then, at every time-up (for example, every ten minutes), the processes in steps S14~S18 are performed by a timer interrupt (step S14). Besides this, the terminal 10 always monitor the state of the device (step S12) and mainly performs a process corresponding to a monitor phenomenon every time the monitor phenomenon occurs according to a user's operation (yes in step S13). In FIG. 2, the monitor phenomenon includes the open operation of an arbitrary file by a user, the update operation of this file, the close operation of this file, a shutdown operation and the like.

Firstly, the process by a timer interrupt is described. When there is a timer interrupt (yes in step S14), firstly, the RFID reader 11 reads the data of each type of the various RFID tag (RFID codes). Hereinafter, RFID codes read from the device RFID tag, user RFID tag and place RFID tag are called "device RFID code", "user RFID code" and "place RFID code", respectively.

The RFID reader 11 does not always read all the three types of RFID codes. Depending on the state, it may be only one type or only two types. In any case, all readable RFID codes are read and are compared with the stored RFID code (step S15).

If as a result of the comparison, both completely coincide with each other (no in step S16), it mean that there is no change in its using condition. In this case, the flow returns to step S12 without any processes. If as a result of the comparison, the read RFID code does not coincide with the stored RFID code (yes in step S16), it mean that there is a change in its using condition. In this case, the read RFID code is newly stored (step S17) and is transmitted to the server 20 (step S18).

The fact that a using condition changes mean, for example, that its user changes or that a using place changes. Specifically, for example, if first the owner itself of the user PC terminal 10 uses the user PC terminal 10 at its own seat and then the process is performed while the user leaves the seat. In this case, since its user RFID code cannot read, in step S16 the read RFID code does not coincide with the stored RFID code. Alternatively, if the owner itself moves from its own seat to its boss's seat while carrying the user PC terminal 10 with it, its place RFID code changes. In this case, both do not coincide with each other. Immediately after power is switched on, no RFID code is stored. Therefore, in this case too, the read RFID code does not coincide with the stored RFID code.

In this way, the using state (a user and a place) of the user PC terminal 10 is regularly checked. If the using state changes, the changed RFID code is notified to the server 20. The server 20 modifies the using qualification (security level given to the terminal 10) as required.

Next, the process in the case where each type of monitor phenomenon occurs according to the user's operation is described.

Firstly, if a user opens an arbitrary file (yes in step S19), first it is determined whether the relevant specified file is a security target (step S20). A security target file means, a file whose contents include information kept secret from people outside the company and important information (important information file) or the like. Its determination method is various. For example, the name of a security target file is made to include data indicating that it is a security target (for example, the file name always includes a character "important". Alternatively, its sentence is made to include a character, "confidential", "important" or the like. Alternatively, the manager or the like of the server 20 determines the security level of each file in advance and a file name-security level correspondence table, which is not shown in FIG. 1, or the like can be stored in the user PC terminal 10 in advance.

If the specified file is not a security target file (no in step S20), that is, a general information file, the specified file is opened (step S21). If the specified file is a security target file (yes in step S20) and also if this file is encoded (yes in step S22), the hash value of this file is generated and an open request is transmitted to the server 20 together with this hash (steps S23 and S24). And checking process using the hash value is executed on the server 20 side since there is a possibility that the open request is permitted, for example, if a malicious user modifies the name of the security target file to a name with a low security level.

If security target files are not stored in the user PC terminal 10 and stored in the server 20, and a security target file is downloaded on to the user PC terminal 10 every time there is an open request (and it is permitted) (no in step S22), the open request for the specified file is simply transmitted to the server 20 (step S24).

When transmitting the open request, each type of RFID tag is further read and the read RFID code is also transmitted to the server 20.

Only if the server 20 permits the open request by a process described later when the file is a security target file, the user can refer to the contents of the file.

If the user performs any correcting work, such as the modification, deletion, addition or the like, of the contents of this file after the open request is permitted and the file is opened, this is detected (yes in step S25) and its level in process is modified to "update" (step S26).

If the user instructs to close the opened file (yes in step S27), it is checked whether the level in process is "update" (step S28). If it is "update" (yes in step S28), specifically if there is any change in the opened file, the contents of the file after update is transmitted to the server 20 to request for its check (step S29). Then, the level in process is made "during check" (step S30) and the flow returns to step S12.

Alternatively, the user instructs to copy (store) an arbitrary file in a flexible disk (FD), CD-R or the like (yes step S70), the flow proceeds to step S29 regardless of the level in process. Specifically, the contents of the relevant file to be stored are transmitted to the server 20 to request for its check (step S29). Then, the level in process is made "during check" (step S30) and the flow returns to step S12.

If the level in process is "update" (no in step S28), the file is closed without any processes (step S31). In this case, if this file is a security target file, this file is erased. If the file is encoded, only the decoded file is erased and the original file is left as it is. In order to refer to the same file again, an open request must be transmitted and permitted again.

In this case, if the system is in a shutdown process (yes in step S32), the flow proceeds to step S34. If there is another open file (yes in step S34), the flow proceeds to step S28 and similarly the process at the time of a close request is also applied to this file.

If the user instructs a shutdown (yes in step S33) while there is an open file (yes in step S34), similarly the flow proceeds to step S28 and the process at the time of a close request is also applied to this file.

Next, the process in the case where there is a response from the server 20 in response to any process in steps S18, S24 and S29 is described.

Figure 4:
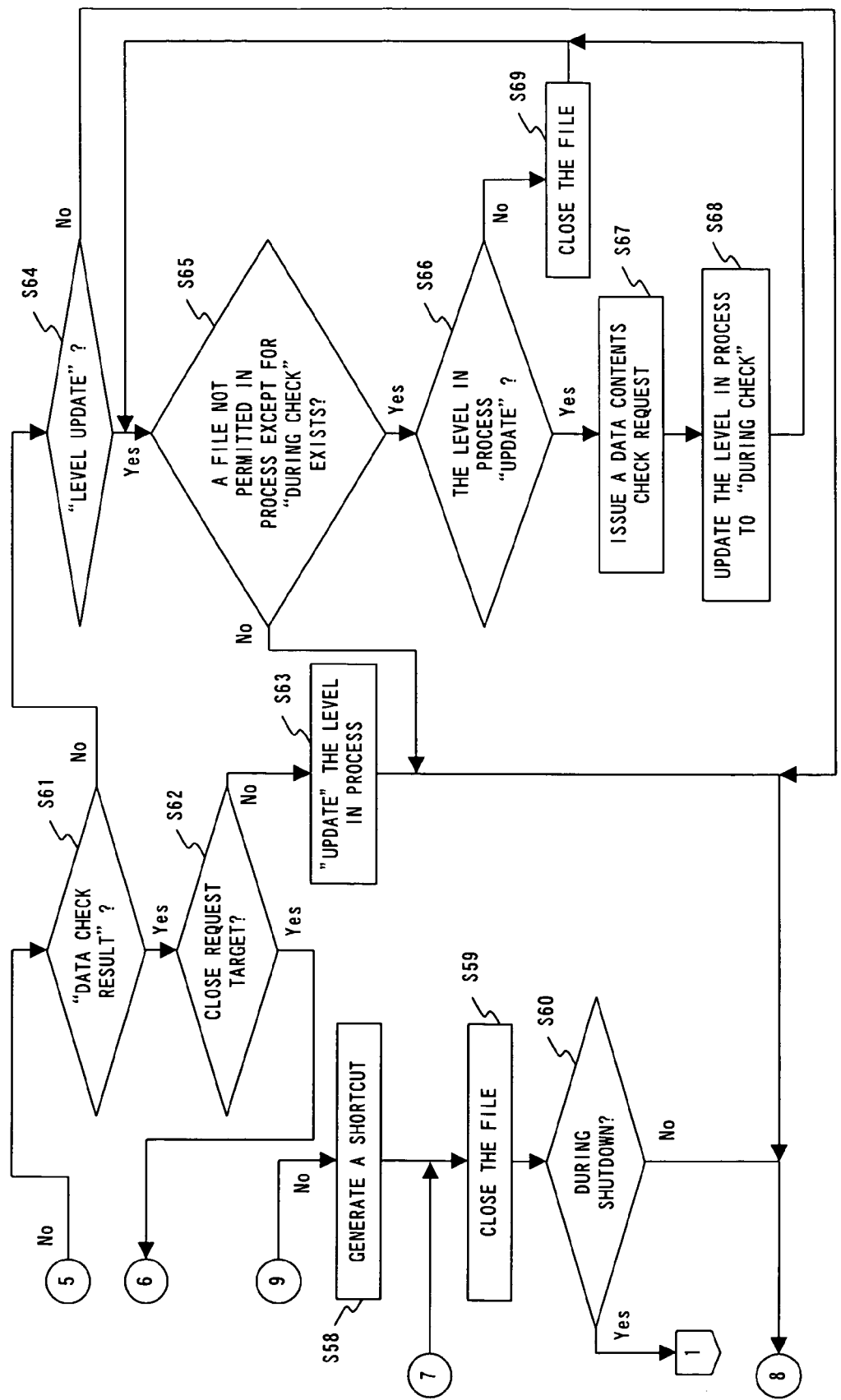
FIG. 4 is a flowchart showing the process of a user PC terminal (No. 3)

Specifically, when receiving a response from the server 20 (yes in step S41), the type of the response is identified (step S42) and a process according to the response type is performed. In FIG. 4, there are seven response types of "start refuse", "start permit", "open permit", "open refuse", "close instruction", "data check result" and "level modification".

Firstly, "start refuse"/start permit" is described. In this case, even if power is switched on, this user PC terminal 10 does not immediately start. Firstly, by steps S14 through S18, the read RFID codes are transmitted to the server 20. Only when the server 20 notifies "start permit", the start process is performed.

Thus, if the response from the server 20 is "start refuse" (yes in step S43), for example, the refuse of the start is notified to the user (step S44), and stop the start process (step S45). If the response from the server 20 is "start permit" (yes in step S46), the start process is performed (step S47). Although in an example described later, the start of a terminal 10 already registered in the server 20 can be permitted, it is permitted only when the user is the owner of the relevant user PC terminal 10 or only when the user is permitted to use it in advance (for example, its boss, it colleague or the like) if it is other than its owner, the start can be permitted and the start itself can be refused when a person other than the owner attempts to use it.

Next, the response to the open request in step S24 is "open permit" or "open refuse". If the response is "open permit" (yes in step S48) and if the specified security target file is encoded, since the response includes its decoding key (yes in step S49), the data of the encoded file is decoded using the decoding key (step S50) and the decoded file is opened (step S51). If the security target file is stored in the server 20, this file is downloaded together with "open permit" (no in step S49). Therefore, in this case, the downloaded file is opened (step S51).

Furthermore, since in either of the cases, the security level of the permitted file is notified together with "open permit", this is stored, for example, in the in-use file table 40 (step S52).

If the response type is "open refuse" (yes in step S53), "open refuse" is displayed on the monitor of the user PC terminal 10 or so on (step S54) and the file is not opened.

A response to the data contents check request in step S29 or step S67 described later from the server 20 is "close instruction" in step S170 or "data check result" in step S171, described later. As described later, the data contents check process of the server 20 in response to the data contents check request resets the security level of this file by checking the contents of the modified file. "Data check result" is basically a newly set security level. However, more particularly in step S67, "close instruction" is sometimes compulsorily notified in some case, which will be described in detail later.

When the response type is "close instruction" (yes in step S55), if an encoding key is attached to this response, the file to be closed is encoded (yes in step S56 and step S57). If not so (no in step S56), a short cut to the relevant file to be closed is generated (step S57). Then, the file to be closed is closed. Furthermore, the closed file is erased. If the file is encoded, a file obtained by decoding it is erased, but the encoded file itself is not erased (step S59). In this case, if the file is in the shutdown process yes in step S60), the flow proceeds to step S34.

If the response type is the "data check result" of the check request (yes in step S61) and also if it is a response to the check request by the close request in step S27 (yes in step S62), the flow proceeds to step S56 and the file closing process is performed.

If it is a response to the check request in step S67 (no in step S62), the level in process is made "during check" in step S68. Therefore, "during check" is returned to "update" (step S63). For this, for example, a case where although security level 1 is originally given to the terminal 10, determination in each of steps S64, S65 and S66 becomes yes since the security level of the terminal 10 is modified to 0 while an arbitrary file with security level 1 is being modified after being opened and a data check request is issued to the server 20, the continuation of the modification work is permitted without compulsorily closing the file since as a result of the data check, the security level of the relevant file is modified to '0', can be anticipated.

If the server 20 determines that its security level is modified when in step S18 its RFID code is transmitted to the server 20, in step S129 described later a security level after modification is notified from the server 20 as a level modification. Therefore, when receiving this notice (yes in step S64), it is determined whether there is a file which is "not permitted" in the security level after this modification and also is being opened (step S65).

For example, since first a legal user uses the portable information processing device in a right place (its own seat, a conference room, a specific customer or the like), its security level is set to '1' and even an important information file can be opened and is actually opened. However, if the user changes its location in the middle or leaves its seat, sometimes security level '0' is notified as the level modification.

Therefore, in this case, all important information files are "not permitted", and if there is an important information file being opened, they must be closed. However, if the data check of this important information file is being requested, the relevant file is closed in steps S61 and S59 after the server 20 returns its data check result.

If there is a file which is "not permitted" by the modification of its security level and which is being opened, as described above (except for a file whose check is being requested) (yes in step S65), the relevant file is immediately closed (step S69) if no modification work is applied to this file (no in step S65). If any modification work is applied to this file, as described above, its security level is made "update" (yes in step S66). Therefore, the same processes in steps S29 and S30 are applied to the file (steps S67 and S68).

FIG. 5A shows an example of a table 30 (table for storing read RFIDs) stored in the memory of the RFID reader 11. In the table 30 shown in FIG. 5A, RFID codes 31, 32 and 33 store various types of RFID codes (a device RFID code, a user RFID code and a place RFID code) read from the various RFID tags. In step S15, a newly read RFID code and the RFID code stored in the table 30 are compared.

FIG. 5B shows an example of an in-use file table 40. The table 40 shown in FIG. 5B comprises a file name 41 and a security level 42. The file name 41 stores the names of files currently opened in this terminal 10, and the security level 42 stores their security levels. As described above, for example, if the security level 42 is '0', the file is a general document file.

If the security level 42 is '1', the file is an important document file. The current security level given to the terminal 10 is also stored separately, which is not specially shown in FIG. 1. Thus, in step S65, a file not permitted is determined by comparing the security level of the terminal 10 with each security level 42.

FIGS. 6A through 8B are flowcharts showing the process of the server 20.

Figure 6A:
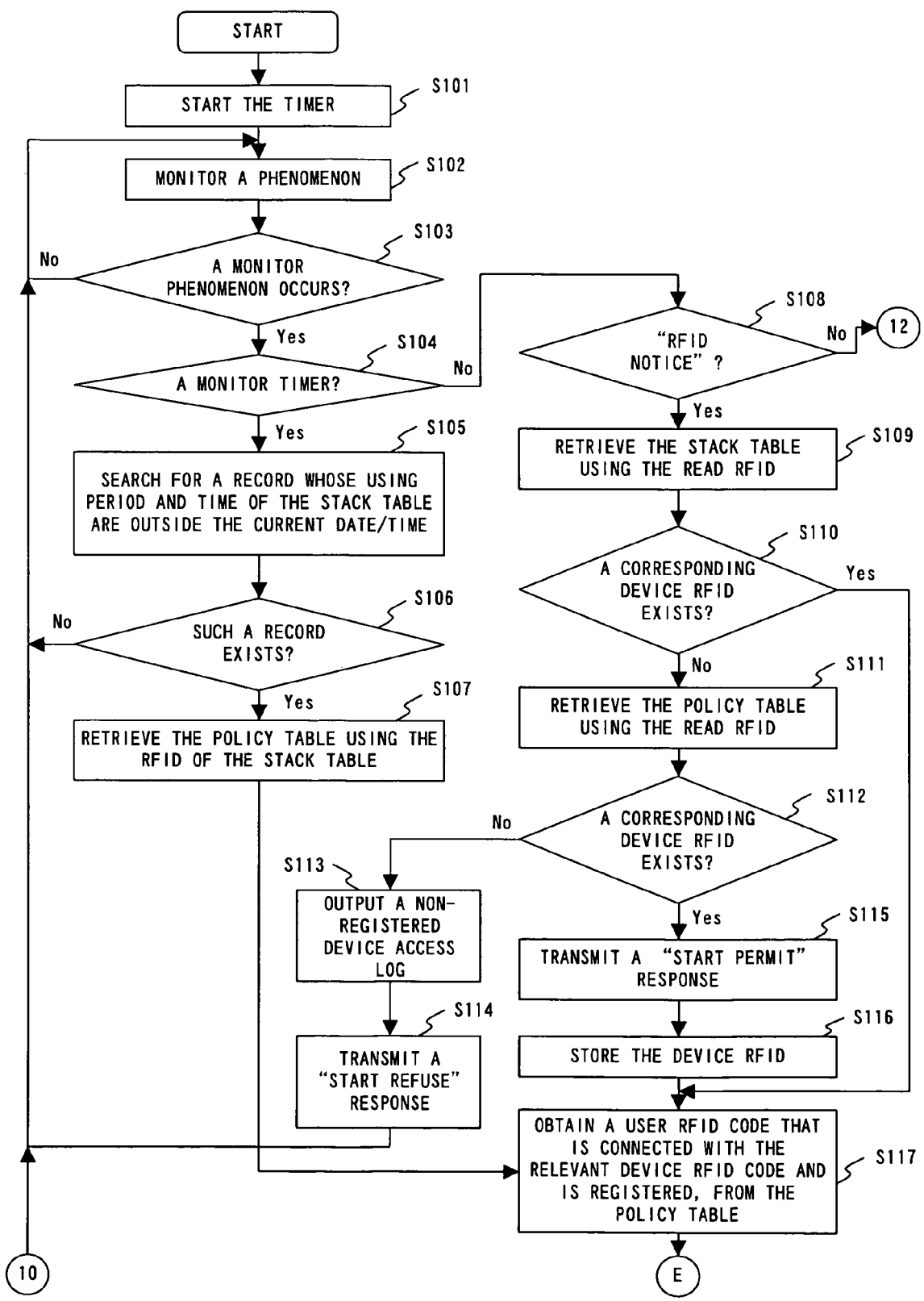
FIGS. 6A,6B is a flowchart showing the process of a server (No. 1)
Figure 6B:
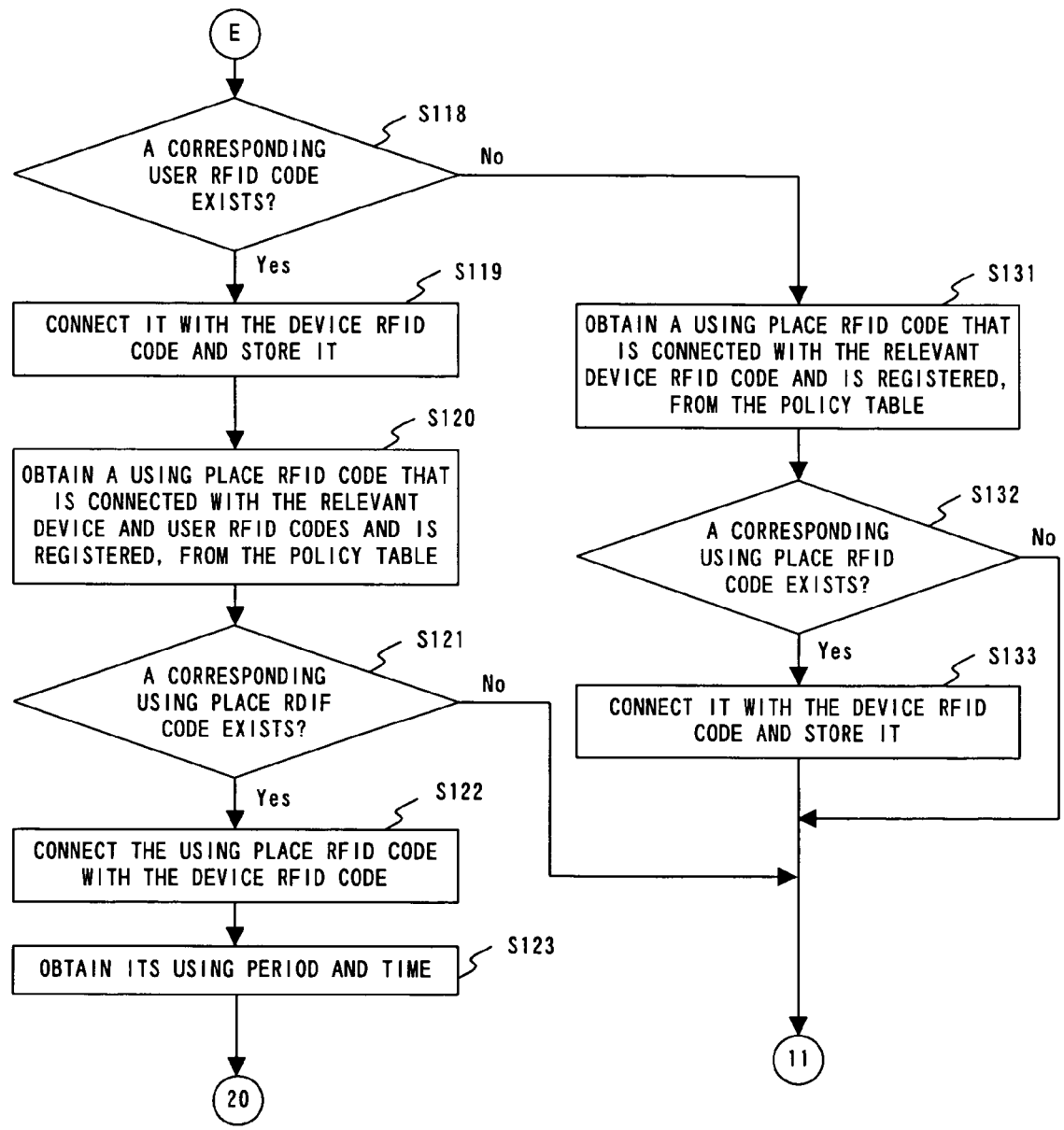

Firstly, in FIG. 6A, the server 20 starts a monitor timer after power is switched on (step S101). Then, the server 20 repeats time-up and re-start like time-up→re-start→time-up→re-start and so on. Then, at each time-up (for example, every ten minutes), processes in steps S105 and after are performed by a timer interrupt. Besides this, the server 20 always monitors the state of the device (step S102) and mainly performs a process according to each of the various types of requests from the user PC terminal 10.

Firstly, the process in the case where the user PC terminal 10 transmits an RFID code in step S18 is described below. In this case, the determinations in steps S103, S104 and S108 are yes (a monitor phenomenon occurs), no (a phenomenon other than time-up) and yes (RFID notification), respectively, and the flow proceeds to steps in S109 and after.

Firstly, a stack table 50 is retrieved using a received (transmitted by the user PC terminal 10) RFID code (step S109).

FIG. 9A shows an example of the stack table 50. In Fig. FIG. 9A, the stack table 50 comprises fields of an RFID code (PC) 51, an RFID code (people) 52, an RFID code (location) 53, a security level 54, a using period 55, a using time 56 and a file name 57. The stack table 50 stores the policy information of the user PC terminal 10 currently used (not switched off).

Firstly, the stack table 50 is retrieved using a received device RFID code (step S109) to determine whether there is a record whose code coincides with the RFID code (PC) 51 (step S110). If the received device RFID code is not registered in the stack table 50 yet (no in step S110), there is a possibility that the RFID code may be transmitted in step S18 after the power of the user PC terminal 10 is switched on (that is a new connection). Therefore, in this case, the RFID code must be newly registered in the stack table 50. However, there is also a possibility that no RFID code may not transmitted. There is also a possibility that the received device RFID may not be registered in policy table 60.

Therefore, the policy table 60 is reference using the received device RFID code (step S111) and it is determined whether the received device RFID code is registered (step S112). If the device RFID code is not transmitted, the determination in step S111 is no.

FIG. 9B shows an example of the policy table 60.

The policy table 60 shown in FIG. 9B stores a policy 64 in accordance with each specific combination of three types of RFID codes 61a, 62a and 63a corresponding to a device 61, a user 62 and a using location 63, respectively. The policy 64 includes, for example, items of a security level 64a, a using period 64b, a using time 64c and a file name 64d.

Specifically, a specific user and its using location are registered for each device 61 in advance. In this case, as shown in FIG. 9B, a plurality of patterns can also be registered for each device 61. In FIG. 9B, for example, as to a device with a code '0304', three patterns of a user "A" and its using place "A's seat", a user "B" (A's boss) and its using place "B's seat", and a user "B" and its using place "A's seat" are registered. A policy 64, which is a permit condition for referring to an important information file, is registered for each pattern. However, if a pair of a user and its using place coincides with one of the three patterns prior to the policy check, the important information file cannot be referenced (or the device 61 cannot be used (its start is refused).

In steps S111 and S112, the RFID code 61a of the device 61 is retrieved using the received device RFID code and it is determined whether there is a code which coincides with the RFID code. If there is no corresponding code or if the device RFID code itself is not transmitted (no in step S112), the server 20 is accessed by an unregistered device. In this case, its access log is recorded (step S113) and a start refuse is transmitted to the access source device as a response (step S114). In this case, the determination in step S43 is yes.

If the received device RFID code is registered in the policy table 60 (yes in step S112), a start permit response is transmitted to the access source device (step S115). In this case, the determination in step S46 is yes. Then, the received device RFID code is temporarily stored (step S116).

Then, the RFID codes 62a of all users 62 corresponding to the relevant RFID code 61a are obtained by referring to the policy table 60 (step S117) and it is determined whether there is a RFID code 62a which coincides with the received user RFID code in them (step S118). In FIG. 9B, as to the terminal 10 whose RFID code 61a is '0304', the determination in step S118 is yes only when the user is "A" or "B". When the terminal 10 cannot read a user RFID code, the user RFID code is not transmitted. Therefore, the determination in step S118 is no.

If the determination in step S118 is yes, the received user RFID code is connected with the device RFID code temporarily stored in step S116 and is stored (step S119). Then, the RFID 63a of all using locations 63 of a record corresponding to the received device RFID code and user RFID codes are obtained by referring to the policy table 60 (step S120) and it is determined whether there is an RFID 63a which coincides with the received place RFID code in them (step S121).

For example, if the user "B" uses the terminal 10 whose RFID code 61a is '0304', the determination in step S121 is yes only when the user B uses the terminal 10 at its own seat or at the A's seat. When the terminal 10 cannot read a place RFID code, the place RFID code is not transmitted. Therefore, the determination in step S121 is no.

The policy table 60 shown in FIG. 9B includes the additional table 70 shown in FIG. 9B. If its owner or the like wants to refer to an important information file mainly outside the company, the owner or the like must apply for it in advance. Only when the application is accepted, the applied contents (permit conditions) are registered in the additional table 70. The permit conditions are a specific place, such as a customer or the like (place RFID code assigned to this place in advance), its visit date (a using period and a using time) and a specific file.

In FIG. 9B, for example, the terminal 10, the RFID code 61a of whose device is '0301', usually is permitted to refer to an important information file at Kamata SS (the department/section to which the owner belongs). However, if its owner or a legal user applies for it in advance, the reference of the important information file at another place is temporarily permitted. However, in this case, all important information files cannot be referenced. In FIG. 9B, its owner or the like applies in advance for the reference permit of a file whose name is "ABC.xls" "on the second floor of a company which is the company of one of its clients" between 10 through 12 o'clock on Oct. 28, 2005 (since the owner or the like is scheduled to visit its customer in the company A at this time/time zone and to make a presentation using the file "ABC.xls") and the application is accepted. Therefore, its application contents are registered in the additional table 70, as shown in FIG. 9B.

If the determination in step S121 is yes, the received place RFID code is connected with the device RFID code temporarily stored in step S116 and is stored (step S122).

In this case, since the terminal 10 reads all three types of RFID codes of a device, a user and a place and transmits them, and a combination of these three types of RFID codes are registered in the policy table 60, the minimum condition is met. However, in this preferred embodiment, a level (using qualification) stored in the security level 64a cannot obtained only by this, and conditions for the using period 64b and using time 64c stored in the policy 64 must be also met.

Then, the policy 64 of the relevant record of the policy table 60 is obtained (step S123), the using period 64b and using time 64c are compared with the current time (step S124) and it is determined whether the current date is within the using period and also the current time is within the using time 64c (step S125). If the determination in step S125 is yes, the obtained policy 64 (the security level 64a, the using period 64b, the using time 64c and the file name 64d) is connected with the device RFID temporarily stored in step S116 and is stored (step S126).

In the file name 64d, "*.*" mean all files. Therefore, for example, if the determination in step S125 is yes and also the security level 64a is '1' when the file name 64d is "*.*", all files at security level 1 (important information files) can be opened. However, if the file name 64d stores a specific file name ("ABC.xls" in FIG. 9B) even in the same conditions as this, only this file can be opened and the other important information files cannot be opened. No reference conditions are imposed on a general file (whose security level is '0'), which can be always opened.

In FIG. 9B, there are only two types of security levels, '0' and '1', and there is only the distinction between a general information file and an important information file. However, the distinction is not limited to this. For example, there can also be security levels 0 through 2. In this case, '0', '1' and '2' indicate a general information file, an important information file and the most important information file, respectively (In this case, both the important information file and the most important information file are handled as security target files). The most important information file can also be prevented from being referenced outside the company (even by a customer). Alternatively, although the most important information file cannot be referenced by a user A at all, its boss B can also be made to refer to it if the conditions of the policy table are met.

Then, in the stack table 50, it is checked whether there is a record whose RFID code 51 coincides with the device RFID code temporarily stored in step S116 (step S127). If there is no such record (no in step S127), the relevant temporarily stored device RFID code and all pieces of data that are connected with this device RFID code and is stored are additionally stored in the stack table 50 (step S136). If the RFID code is notified after the power of terminal 10 is switched on, the determination in step S127 is no.

If the determination in step S127 is yes, the storage contents of the relevant record are updated (step S128) and its security level 54 is notified to the terminal 10 as "level modification". However, the "level modification" does not always means to actually modify the security level.

If the determination in step S125 is no, different from in step S126, its security level is compulsorily set to '0' and is stored (steps S134 and S135). This is also true when the determination in step S118 or S121 is no. Specifically, unless all of the device, user and using place and time meet their respective pre-registered conditions, the reference of an important information file is not permitted.

If the relevant using place RFID code 63a is stored in the policy table 60 when the determination in step S118 is no (yes in step S132), the using place RFID code 63a is connected with the device RFID code and is stored (step S133). If there is no corresponding code, it is not stored. If the determination in step S110 is yes, specifically if at least the device RFID code is stored in the stack table 50 by the process immediately after the power of the terminal 10 is switched on (that is, if an RFID code regularly transmitted by the timer of the terminal 10 is received), there is no need to perform the processes in steps S111 through S116. Therefore, the flow proceeds to step S117.

As described above, in this preferred embodiment, even when all device, user, and place conditions are met, there is a restriction in a time zone where an important information file can be referenced (However, this time zoon restriction can also be deleted and be replaced with another condition. Alternatively, another condition can be added). Thus, sometimes first its reference is permitted and then its permitted time zoon elapses away after time elapses. Therefore, the time zoon must be regularly checked. Although as described above, the terminal 10 regularly transmits an RFID code for that purpose, the server 20 can also regularly check it. Specifically, the using period 55 and using time 56 of the stack table 50 is referenced and compared with the current date/time every time the monitor timer times up (yes in step S104). If there is a record whose "using period 64b" and "using time 64c" are outside the current date/time (yes in steps S105 and S106), the RFID codes 51, 52 and 53 of the relevant record are obtained and the policy table 60 is retrieved using these RFID codes (step S107). Then, the flow proceeds to step S117. In other words, in this case, since the terminal 10 notifies no RFID code, the processes in steps S117, S120 and S131 are performed using the RFID codes 51, 52 and 53, respectively.

Next, the process in the case where the open request is received in step S24 (yes in step S141) is described. The open request includes a file name to be requested and a read RFID code. If a file to be requested is encoded, the hash generated in step S23 is also transmitted.

Firstly, a file name table 70 is retrieved using the file name to be requested and the security level 73 of the relevant record is obtained (step S142). Then, the stack table 50 is retrieved using the received device RFID code and the security level 64 of the record is obtained (steps S143 and S144). Then, it is determined whether its security level is a permit level by comparing the respective security levels obtained in steps S142 and S144 (step S145). Specifically, if the current security level given to the terminal 10 (using qualification) coincides with or is higher in order than the security level of a file to be requested, the determination in step S145 is yes. The higher order mean, for example, that the security level of the file is '1' while the security level of the terminal 10 is '2'.

If the determination in step S145 is yes, furthermore, the using period 64b and using time 64c of the relevant record in the stack table 50 are obtained and are compared with the current date/time. If the current date/time is within the using period and time (yes in step S146), the flow proceeds to step S147 and it is determined whether the relevant file should be permitted (step S147). In step S147, it is determined whether there is a file whose name coincides with the name of the file requested to open, referring to its file name 57 (in this case, if the file name 57 is "*.*", it is always determined that they coincide with each other).

If even one of the conditions in steps S145, S146 and S147 is not met, no reference of the requested file is permitted and "open refuse" is notified to the terminal 10 (step S154).

If the determination in step S147 is yes, basically the reference of the requested file is permitted. However, if the requested file is encoded (yes in step S148), its hash value 74 is obtained from the file name table 70 shown in FIG. 9C and if it does not coincides with the received hash value (no in step S149) too, "open refuse" is notified to the terminal 10 (step S154). If they coincide with each other (yes in step S149), a decoding key is obtained (step S150) and "open permit" is transmitted to the terminal 10 together with this decoding key (step S152). If the determination in step S147 is yes and if the requested file is not encoded (no in step S148), the data of the requested file is obtained (step S151) and "open permit" is transmitted to the terminal 10 together with this file data (step S152).

Lastly, the relevant record of the stack table 50 is updated (step S153).

Next, the process in the case where a data contents check request is received in step S29 and S67 accompanied by the close request and level modification, respectively, (yes in step S161) is described. In this case, the read RFID code is transmitted together with the check request.

In this case, firstly, a security dictionary database (DB) is referenced and the security level of the requested file is determined (step S162). Although this process is the prior art and a detailed example of the security dictionary DB is not especially shown, the security dictionary DB stores various rules for determining the security level. For example, the security dictionary DB describes "if there is a character, "important" or "confidential" in a document, its security level is '1'". Thus, for example, although in FIG. 9 "ABC.xls" is at security level 1, the security level may be modified to '0' if important information is deleted by a user's editing work in the terminal 10. Conversely, the security level 0 of a file may also be modified to '1'.

FIG. 10 shows an example of a security level determination method using the security dictionary DB.

In FIG. 10, the security dictionary DB stores, for example, keywords, such as "secret from people outside the company", "secret from people other than the concerned", "confidential information" and the like, and security levels corresponding to them. A security level determination processing unit, which is not shown in FIG. 10, retrieves a file to be processed and determines whether the file contains any of these keywords. If the file contains any of the keywords, the security level of the file to be processed is set to '1'. If the file to be processed a predetermined or more pieces (for example, more than five) of specific information, such as personal information (a name, an address, a mail address, an employee ID, etc.), company information (internal information, an address, the name of a person in charge, settlement information, etc.) or the like, too, the security level of this file to be processed is set to '1'. In this case, each piece of personal information, each piece of company information, the number (for example, more than five) of pieces of such information and their corresponding security levels are stored in the security dictionary DB in advance. Then, the security level determination processing unit, which is not shown in FIG. 10, refers to this and determines its security level.

If the determined security level is '0' (security not required) (no in step S163), the determined security level is returned to the terminal 10 as a data check result (step S171). If the security level of the requestor's terminal 10 is '1' (yes in step S164) and also if the current date/time is within the using period 55 and using time 56 (yes in step S165) even when the security level is other than '0' (yes in step S163) (in this example, explained to be '1' (however, not limited to this), the determined security level is returned to the terminal 10 as a data check result (step S171). Specifically, in this case, the close instruction in step S170 is not executed (the file is not compulsorily closed).

If the determined security level is '1' (important information file) (yes in step S163) and also if the determination in step either S164 or S165 is no, the security level 73 of the relevant file in the file name table 70 is modified to the determined level (if the file name is not registered since it is modified, it is newly registered) (step S169), "close instruction" is issued to the requestor's terminal 10 (step S170) and the relevant file is closed. However, in this case, if the file is an encoding target (yes in step S166), an encoding key is generated, the data of the file is encoded and a hash value is generated (steps S167 and S168). Then, the processes in step S169 and S170 are performed. In this case, in step S169 the generated hash value is also stored in the file name table 70. Furthermore, in this case, in step S170 the generated encoding key is transmitted to the requestor's terminal 10.

If the security level of a file to be stored is other than '0' (yes in step S163) when a data contents check request corresponding to the storage process in step S70 is received, the determination in step S173 "stored?" is yes even when the determinations in steps S164 and S165 both are yes. Therefore, the flow proceeds to step S166 and the file to be stored is encoded and so on. In this case, since determination in step S174 (the same as in step S165) is yes, the flow proceeds to step S171 and the data check result is returned. If the determination in step S174 is no, "close instruction" is returned.

The process corresponding to the storage process in step S70 is not limited to the described above. For example, if the security level of the file to be stored is '0', simply "storage permit" can be notified to the requestor's terminal 10 to copy it in CD-R or the like. If the security level of the file to be stored is other than '0', "storage non-permit" can be notified to the requestor's terminal 10 to absolutely prohibit copying it in CD-R or the like.

The new registration/modification of each record of the policy table 60 can be applied, for example, by the owner or the manager of each terminal 10 accessing the server 20, for example, via an in-house network, using an in-house personal computer or the like. This application request method includes two types of "normal use application" and "carrying application". "Normal use application", for example, limits the use of the terminal 10 to internal use. "Carrying out application" limits the use to use outside the company.

If "normal use application" is requested, for example, the normal use application screen 80 shown in FIG. 11A is displayed. Its applicant inputs the device name of the terminal 10 that the applicant wants to use, a user name (usually the name of its owner itself), a using place and further the name of a person other than the applicant that the applicant allows to use the terminal 10 (its boss, colleague or the like) on this screen. In this case, user names and using place names can also be displayed on a list referring the tables 100, 110 and 120 shown in FIG. 12A through 12C and an arbitrary user name and using place name can also be selected. In this case, in the normal use application, the names of places in the company where a place RFID is located are displayed as a using place list and no names of places outside the company where a place RFID is located are displayed.

As shown in FIG. 12, the tables 100, 110 and 120 store RFID codes corresponding to the user names and using place names. Therefore, if the application is accepted, these RFID codes are obtained and are stored in the RFID codes 61a, 62a and 63a of the policy table 60. The method for determining whether the application is accepted is not especially referenced.

If the user wants to carry out the terminal 10 outside the company (for example, to a customer), "carry-out application" is requested.

If "carry-out application" is requested, the carry-out application screen 90 shown in FIG. 11B is displayed. In this case, different from the normal use application, the device name of a terminal 10 to be carried out and the name of a person carrying out it (user name) are inputted. For example, the names of places outside the company where a place RFID is located are displayed as a using place name list and an arbitrary using place name is selected. Furthermore, the name of a target file is inputted. Since the target file is, for example, a file needed to visit a customer and to explain a product and is considered to be known in advance, its name is inputted. Furthermore, since a scheduled date for visiting a customer and a time zoon where a presentation is made are also almost known in advance, they are inputted as its using period and time, as shown in FIG. 11.

The application contents can also be transmitted, for example, to the personal computer of its boss or the like, be checked by the boss and it can also be determined whether to permit. If the application contents are approved, RFID codes corresponding to the user name and using place name are obtained referring, for example, to the tables 100, 110 and 120, and are newly registered in the policy table 60 together with the application contents. Thus, by receiving the check of the boss or the like, the applicant can be prevented from referring an essentially unnecessary file outside the company without the boss's approval of the application. "In the company" mean "in the company" in a narrow sense. For example, for an employee working in its headquarters, only "in the headquarters building" is "in the company", and "in a branch office, a laboratory and the like" are "outside the company". Alternatively, only "in a specific area (a place or a conference room belonging to the department/section) of the headquarters building" can be "in the company". In summary, it must be determined depending on whether there is a high or low risk of information leak.

FIG. 13 shows an example of the hardware configuration of the user PC terminal 10 or the server 20 (computer).

The computer 200 shown in FIG. 13 comprises a CPU 201, memory 202, an input device 203, an output device 204, an external storage unit 205, a medium driver device 206 and the like, which are connected to a bus 208. The computer 200 can further comprise a network connection device 207. The configuration shown in FIG. 13 is an example and is not limited to this.

The CPU 201 is a central processing unit for controlling the entire computer 200.

The memory 202 is RAM or the like for temporarily storing a program or data stored in the external storage device 205 (or a portable storage medium 209) when executing the program or updating the data and so on. The CPU 201 performs the above-described various types of processes, using the program/data read out in the memory 202. If the computer 200 is, for example, the user PC terminal 10, the computer 200 performs the processes shown in FIGS. 2 through 4. If the computer 200 is, for example, the server 20, the computer 200 performs the processes shown in FIGS. 6 through 8.

The external storage device 205 includes a magnetic disk device, an optical disk device, a magneto-optical disk device or the like, and stores programs/data and the like for realizing the above-described functions. If the computer 200 is, for example, the user PC terminal 10, the external storage device 205 stores the program for enabling the CPU 201 to perform the processes shown in FIGS. 2 through 4 and the data shown in FIG. 5. If the computer 200 is, for example, the server 20, the external storage device 205 stores the program for enabling the CPU 201 to perform the processes shown in FIGS. 6 through 8 and the data shown in FIGS. 9 and 12. These programs/data can also be stored in the portable storage medium 209.

The medium driver device 206 reads out a program/data or the like stored in the portable storage medium 209. The portable storage medium 209 includes a flexible disk (FD), CD-ROM, DVD, a magneto-optical disk and the like.

The network connection device 207 is connected to a network and enables the computer 200 to transmit/receive a program/data and the like to/from an external information processing device.

The input device 203 includes a keyboard, a mouse and the like, and the output device includes a display and the like.

Figure 14:
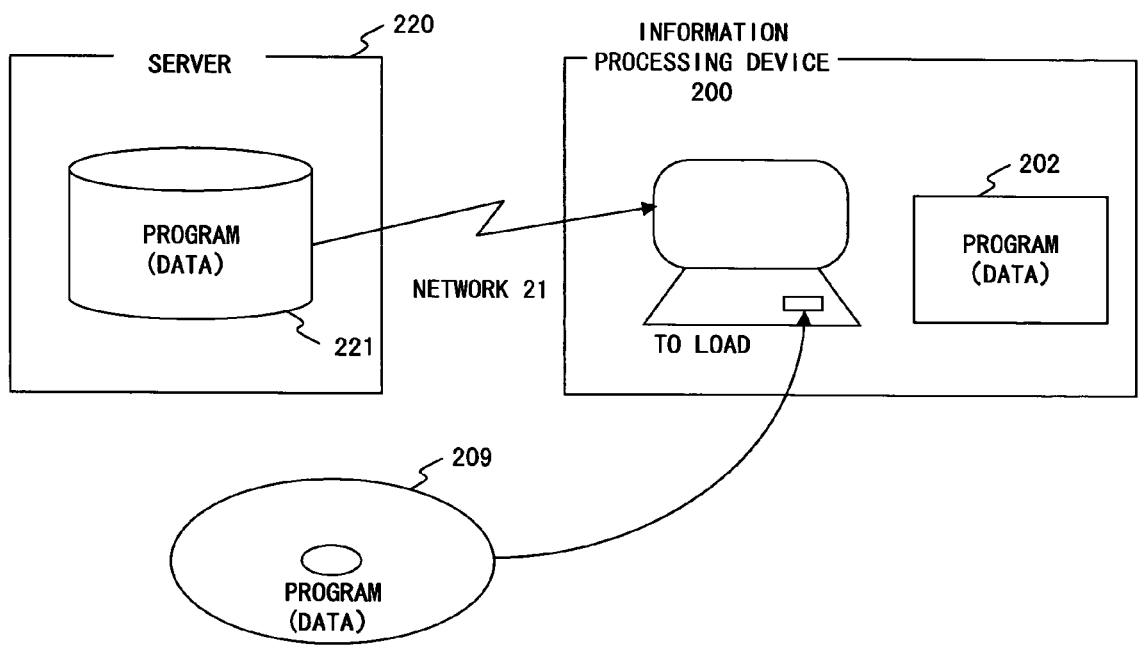
FIG. 14 shows examples of the storage medium and its downloading.

FIG. 14 shows examples of the storage medium recording the program and the like and its downloading.

As shown in FIG. 14, the program/data for realizing the above-described functions can be read out from the portable storage medium 209 storing them to the information processing device 200, be stored in the memory 202 and be executed. Alternatively, the program/data stored in the storage unit 221 of an external server 220 can be downloaded via a network 210 (the Internet, etc.) connected by a network connection device 207.

The present invention is not limited to the device/method, and can be a storage medium (the portable storage medium 209, etc.) itself for storing the program/data. The present invention can be a transmission signal itself by which the program is downloaded via the network 210.

According to the information security system, storage medium and the like of the present invention, more particularly when a portable information processing terminal is used, the risk that important information may leak can be remarkably reduced.

What is claimed is:

1. An information security system comprising:
   a portable information processing device; and
   a server, wherein
   the portable information processing device includes:
   an identification information detection/notification unit to detect detectable identification information of identification information of the portable information processing device, identification information of a user and identification information of a place, and to notify a server of the detected information; and
   a file using control unit to make an inquiry of the server if a file is a security target file when a user specifies an arbitrary file, and to control use of the specified file according to a response to the inquiry; and
   the server includes:
   a first storage unit to store, in advance, a using qualification in connection with each specific combination of the three types of identification information;
   a second storage unit to store, in advance, a level for each file;
   a using qualification determination unit to provide the using qualification corresponding to a specific combination stored in the first storage unit to the portable information processing device, if each piece of the notified identification information coincides with the specific combination; and
   a using permit determination unit to determine whether to permit use of the specified file by computing a level of the specified file referring to the second storage unit when there is the inquiry and comparing the level with the using qualification given to the portable information processing device, and to reply to the file using control unit, wherein
   the portable information processing device further includes a timer to monitor a time interval, and
   the identification information detection/notification unit checks a using condition of the portable information processing device that represents a user and a using place of the portable information processing device by detecting most recent identification information of the portable information processing device,
   identification information of the user and identification information of the using place at the time interval, and notifies the server of the most recent detected identification information if the using condition changes; and
   the using permit determination unit
   determines a new using qualification according to a change of the using condition based on the most recent identification information and
   notifies the portable information processing device of the new using qualification if the using qualification changes.

2. The information security system according to claim 1, wherein
   a using condition is further stored in the first storage unit, and
   if the using condition is not met even when each of the notified identification information coincides with the specific combination stored in the first storage unit, the using qualification determination unit does not provide the using qualification.

3. The information security system according to claim 2, wherein
   the using condition is a period or a time zone, and
   the using quality determination unit determines whether the using condition is met, based on a current date/time.

4. The information security system according to claim 1, wherein
   the first storage unit further stores a specific file name, and
   if a name of the specified file does not coincide with the specific file name, the using permit determination unit does not permit use of the specified file.

5. The information security system according to claim 1, wherein
   the security target file is encoded and stored in the portable information processing device, and
   the using permit determination unit transmits a decoding key of a file whose use is permitted to the portable information processing device.

6. The information security system according to claim 1, wherein
   the security target file is not stored in the portable information processing device, and
   when it is determined to permit the use, the using permit determination unit downloads a file whose use is permitted to the portable information processing device.

7. The information security system according to claim 5, wherein
   the server stores a hash value of each of the encoded file,
   if the specified file is encoded when making the inquiry of the server, a file using control unit of the portable information processing device transmits the hash value of the encoded file to the server, and
   if the received hash value does not coincide with the stored hash value, the using permit determination unit of the server does not permit the use of the specified file, regardless of the using qualification.

8. The information security system according to claim 1, wherein
- the using permit determination unit of the server determines the using qualification based on the identification information regularly notified by the identification detection/notification unit and notifies the portable information processing device of the new using qualification if the using qualification changes, and
- if there is a file whose use cannot permitted by the new using qualification among files in use, the file using control unit of the portable information processing device stops the use of the file.

9. The information security system according to claim 1, wherein
- as to an external place the use of the security target file in which cannot be usually permitted, if the relevant file is registered in advance, the first storage unit stores a combination of the three types of identification information including identification information of the external place and a using qualification corresponding to the combination in order to temporarily permit the use.

10. The information security system according to claim 1, wherein
- each type of identification information of the identification detection/notification unit is an RFID code read from an RFID tag attached to each of the portable information processing device, a user and a place.

11. A server, comprising:
- a first storage unit to store, in advance, a using qualification in connection with each combination of three types of identification information of identification information of a portable information processing device, identification information of a user and identification information of a place;
- a second storage unit to store, in advance, a level for each file;
- a using qualification determination unit to provide the using qualification corresponding to a specific combination to a notifying portable information processing device if each piece of the notified identification information corresponds to the specific combination stored in the first storage unit when the identification information is notified by any of the portable information processing devices; and
- a using permit determination unit to determine whether to permit use of the requested security target file by computing a level of the requested security target file referring to the second storage unit and comparing the using qualification given to a requesting portable information processing device with the computed level, when there is a use request of an arbitrary security target file from any of the portable information processing devices, wherein the using permit determination unit
  - determines the using qualification based on the identification information notified from the notifying portable information processing device when a using condition of the portable information processing device that represents a user and a using place of the portable information processing device changes and
  - notifies the portable information processing device of the new using qualification if the using qualification changes.

12. A computer-readable storage medium on which is recorded a program for causing a computer to perform a method when the computer executes the program, the method comprising:
- storing in a first storage unit, in advance, a using qualification in connection with each combination of three types of identification information of identification information of a portable information processing device, identification information of a user and identification information of a place;
- storing in a second storage unit, in advance, a level for each file;
- providing the using qualification corresponding to a specific combination to a notifying portable information processing device if each piece of the notified identification information corresponds to the specific combination stored in the first storage unit when the identification information is notified by any of the portable information processing devices;
- determining whether to permit use of the requested security target file by computing a level of the requested security target file referring to the second storage unit, and comparing the using qualification given to a requesting portable information processing device with the computed level, when there is a use request of an arbitrary security target file from any of the portable information processing devices; and
- notifying the notifying portable information processing device of a new using qualification if the using qualification changes
- wherein the providing is carried out based on the identification information notified from the notifying portable information processing device when a using condition of the portable information processing device that represents a user and a using place of the portable information processing device changes.

* * * * *